United States Patent
Said

(10) Patent No.: US 11,825,090 B1
(45) Date of Patent: Nov. 21, 2023

(54) BIT-RATE ESTIMATION FOR VIDEO CODING WITH MACHINE LEARNING ENHANCEMENT

(71) Applicant: QUALCOMM Incorporated, San Diego, CA (US)

(72) Inventor: Amir Said, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/931,073

(22) Filed: Sep. 9, 2022

Related U.S. Application Data

(60) Provisional application No. 63/388,554, filed on Jul. 12, 2022.

(51) Int. Cl.
| | |
|---|---|
| *H04N 19/124* | (2014.01) |
| *H04N 19/91* | (2014.01) |
| *H04N 19/146* | (2014.01) |
| *H04N 19/189* | (2014.01) |
| *H04N 19/196* | (2014.01) |

(52) U.S. Cl.
CPC ......... *H04N 19/124* (2014.11); *H04N 19/146* (2014.11); *H04N 19/189* (2014.11); *H04N 19/196* (2014.11); *H04N 19/91* (2014.11)

(58) Field of Classification Search
CPC .. H04N 19/124; H04N 19/146; H04N 19/189; H04N 19/196; H04N 19/91
See application file for complete search history.

(56) References Cited

U.S. PATENT DOCUMENTS

| | | | |
|---|---|---|---|
| 2008/0080615 A1 | 4/2008 | Tourapis et al. | |
| 2010/0061448 A1* | 3/2010 | Zhou | H04N 19/87 375/240.03 |
| 2019/0289296 A1 | 9/2019 | Kottke et al. | |
| 2022/0264168 A1* | 8/2022 | Dahl | H04N 21/2402 |
| 2022/0330062 A1* | 10/2022 | Zaphir | H04W 24/08 |
| 2022/0398692 A1* | 12/2022 | Jiang | H04N 7/147 |

OTHER PUBLICATIONS

Balle J., et al., "End-to-end Optimization of Nonlinear Transform Codes for Perceptual Quality", 2016 Picture Coding Symposium (PCS), IEEE, Dec. 4, 2016, 5 Pages, XP033086823, Section II.
Balle J., et al., "Variational Image Compression with A Scale Hyperprior", arXiv: 1802.01436v2 [eess.IV], May 1, 2018, XP055632204, pp. 1-23, Section 2.

(Continued)

*Primary Examiner* — Joseph Suh
(74) *Attorney, Agent, or Firm* — Polsinelli LLP

(57) ABSTRACT

Techniques are described herein for processing video data. For instance, a technique can include encoding one or more frames of video data using a video encoder, the video encoder including at least a quantization process; determining an actual bit rate of the encoded one or more frames; predicting an estimated bit rate using an encoder proxy, the encoder proxy including a statistical model for estimating a bit rate of the encoded one or more frames; determining, using the encoder proxy, a gradient of the estimated bit rate; and training the encoder proxy to predict the estimated bit rate based on the actual bit rate, the estimated bit rate, and the gradient.

30 Claims, 16 Drawing Sheets

(56) References Cited

OTHER PUBLICATIONS

International Search Report and Written Opinion—PCT/US2023/068288—ISA/EPO—dated Oct. 4, 2023.
Said A., et al., "Differentiable Bit-rate Estimation for Neural-based Video Codec Enhancement", arXiv.org, Cornell University Library, 201 Olin Library Cornell University Ithaca, NY 14853, arXiv:2301.09776v1 [eess.IV], Jan. 24, 2023, XP091423040, Section III, 5 Pages.

\* cited by examiner

1800

```
┌─────────────────────────────────────────────────┐
│ Receive One Or More Frames Of Video Data For Encoding │
│ By A Video Encoder, The Video Encoder Including At Least │
│ A Quantization Process                          │
│ 1802                                            │
└─────────────────────────────────────────────────┘
                         │
                         ▼
┌─────────────────────────────────────────────────┐
│ Predict An Estimated Bit Rate Of The One Or More Frames │
│ After Encoding By The Video Encoder Using An Encoder │
│ Proxy, Wherein The Encoder Proxy Including A Statistical │
│ Model For Estimating The Estimated Bit Rate, And Wherein │
│ The Statistical Model Was Trained Based On A Gradient Of │
│ The Estimated Bit Rate                          │
│ 1804                                            │
└─────────────────────────────────────────────────┘
                         │
                         ▼
┌─────────────────────────────────────────────────┐
│ Adjust One Or More Quality Parameters Based On The │
│ Predicted Estimated Bit Rate                    │
│ 1806                                            │
└─────────────────────────────────────────────────┘
                         │
                         ▼
┌─────────────────────────────────────────────────┐
│ Encode The One Or More Frames Of Video Data Using The │
│ Video Encoder, The Video Encoder Including At Least A │
│ Quantization Process                            │
│ 1808                                            │
└─────────────────────────────────────────────────┘
```

FIG. 18

BIT-RATE ESTIMATION FOR VIDEO CODING WITH MACHINE LEARNING ENHANCEMENT

CROSS-REFERENCE TO RELATED APPLICATIONS

This application claims the benefit of U.S. Provisional Application No. 63/388,554, filed Jul. 12, 2022, which are hereby incorporated by reference, in its entirety and for all purposes.

FIELD

The present disclosure generally relates to video coding (e.g., encoding and/or decoding video data). For example, aspects of the present disclosure are related to systems and techniques for performing bit rate estimation for enhancing video coding using machine learning.

BACKGROUND

Many devices and systems allow video data to be processed and output for consumption. Digital video data includes large amounts of data to meet the demands of consumers and video providers. For example, consumers of video data desire high quality video, including high fidelity, resolutions, frame rates, and the like. As a result, the large amount of video data that is required to meet these demands places a burden on communication networks and devices that process and store the video data.

Video coding techniques may be used to compress video data. A goal of video coding is to compress video data into a form that uses a lower bit rate, while avoiding or minimizing degradations to video quality. With ever-evolving video services becoming available, encoding techniques with better coding efficiency are needed.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below Systems and techniques are described for coding (e.g., encoding and/or decoding) image and/or video content. In one illustrative example, a method of processing video data is provided. The method includes: encoding one or more frames of video data using a video encoder, the video encoder including at least a quantization process; determining an actual bit rate of the encoded one or more frames; predicting an estimated bit rate using an encoder proxy, the encoder proxy including a statistical model for estimating a bit rate of the encoded one or more frames; determining, using the encoder proxy, a gradient of the estimated bit rate; and training the encoder proxy to predict the estimated bit rate based on the actual bit rate, the estimated bit rate, and the gradient.

In another example, an apparatus for processing video data is provided. The apparatus includes: at least one memory; and at least one processor coupled to the at least one memory, the at least one processor being configured to: encode one or more frames of video data using a video encoder, the video encoder including at least a quantization process; determine an actual bit rate of the encoded one or more frames; predict an estimated bit rate using an encoder proxy, the encoder proxy including a statistical model for estimating a bit rate of the encoded one or more frames; determine, using the encoder proxy, a gradient of the estimated bit rate; and train the encoder proxy to predict the estimated bit rate based on the actual bit rate, the estimated bit rate, and the gradient.

In another example, a non-transitory computer-readable storage medium is provided that has stored instructions that, when executed by one or more processors, cause the one or more processors to: receive one or more frames of video data for encoding by a video encoder, the video encoder including at least a quantization process; predict an estimated bit rate of the one or more frames after encoding by the video encoder using an encoder proxy, wherein the encoder proxy including a statistical model for estimating the estimated bit rate, and wherein the statistical model was trained based on a gradient of the estimated bit rate; adjust one or more quality parameters based on the predicted estimated bit rate; and encode the one or more frames of video data using the video encoder, the video encoder including at least a quantization process.

In another example, an apparatus is provided. The apparatus includes: means for receiving one or more frames of video data for encoding by a video encoder, the video encoder including at least a quantization process; means for predicting an estimated bit rate of the one or more frames after encoding by the video encoder using an encoder proxy, wherein the encoder proxy including a statistical model for estimating the estimated bit rate, and wherein the statistical model was trained based on a gradient of the estimated bit rate; means for adjusting one or more quality parameters based on the predicted estimated bit rate; and means for encoding the one or more frames of video data using the video encoder, the video encoder including at least a quantization process.

In some aspects, the apparatus comprises a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 18 is a flow diagram illustrating a technique for performing bit rate estimation, in accordance with aspects of the present disclosure;

DETAILED DESCRIPTION

Figure 1:
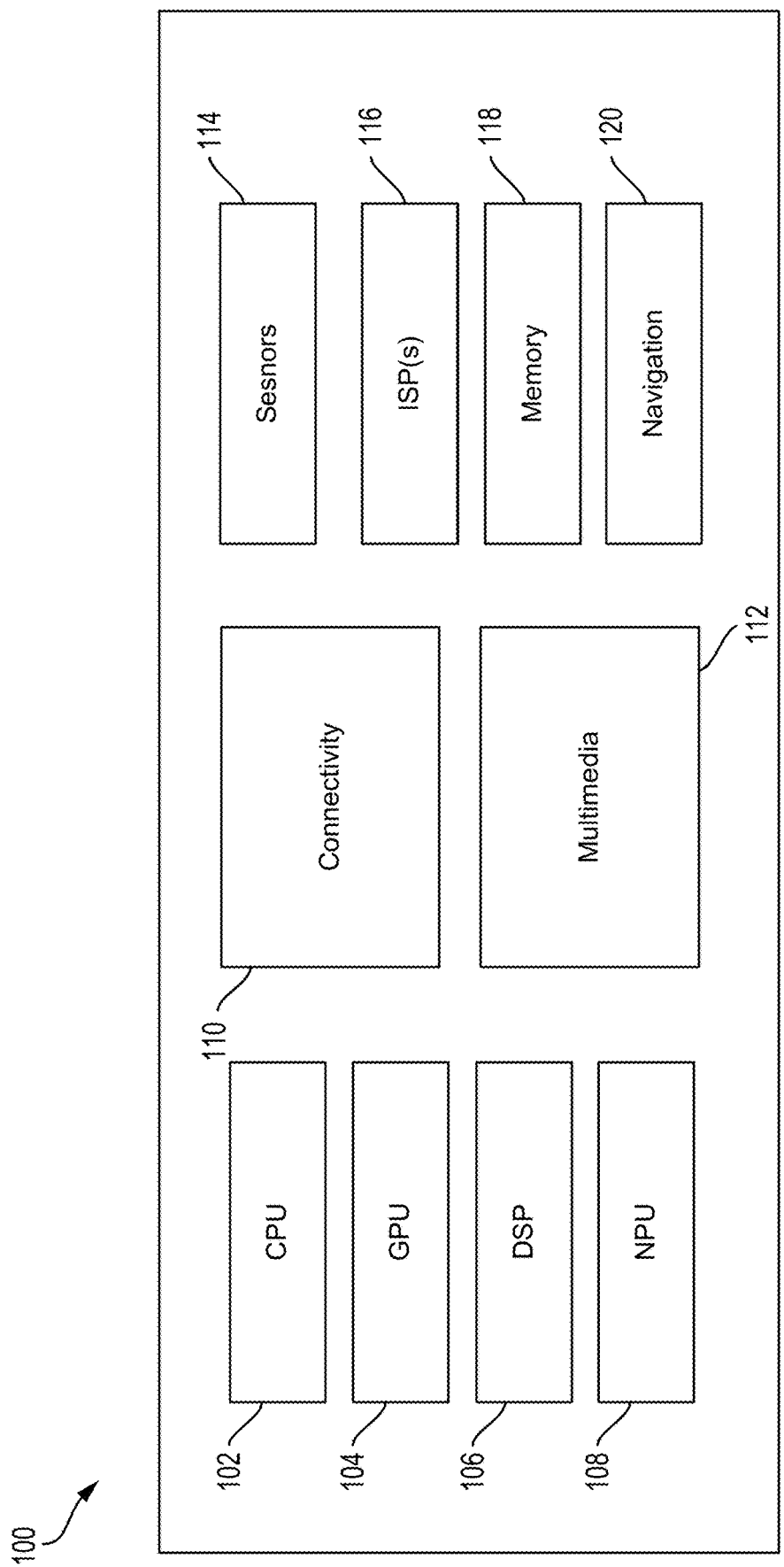
FIG. 1 illustrates an example implementation of a system-on-a-chip (SOC), in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Digital video data can include large amounts of data, particularly as the demand for high quality video data continues to grow. For example, consumers of video data typically desire video of increasingly high quality, with high fidelity, resolution, frame rates, and the like. However, the large amount of video data required to meet such demands can place a significant burden on communication networks as well as on devices that process and store the video data.

Various techniques can be used to code video data. Video coding can be performed according to a particular video coding standard or can be performed using one or more machine learning systems or algorithms. Example video coding standards include versatile video coding (VVC), high-efficiency video coding (HEVC), advanced video coding (AVC), moving picture experts group (MPEG) coding (e.g., MPEG-5 Essential Video Coding (EVC) or other MPEG-based coding), AOMedia Video 1 (AV1), among others. Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error using transform coding (e.g., using a form of a discrete cosine transform (DCT), a form of a discrete sine transform (DST), or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

As described in more detail below, systems, apparatuses, methods (also referred to as processes), and computer-readable media (collectively referred to as "systems and techniques") are described herein for performing bit rate estimation for enhancing video coding using machine learning. In some devices, video codecs may be implemented using custom hardware such as application specific integrated circuits (ASICs). Custom hardware helps enables high efficiency in terms of processing speed and power usage, but greatly reduces flexibility, since additional features require designing and deploying new hardware, which can be slow and expensive.

Techniques have been proposed to improve performance, while leveraging codec hardware ubiquity, by adaptively modifying the video before encoding and after decoding. Recent proposals demonstrate the advantages of using machine learning and neural networks for that purpose, since they can use advanced algorithms and extensive training to better identify how the video compression can be improved. This approach may be referred to as standard video codec neural boosting.

A fundamental problem with many such techniques is that the design and optimization of neural-based solutions are much more effective when they can use derivatives of the bit rate and distortion performance measurements. However, those derivatives may not be obtainable from the complex standard video codecs, and consequently they cannot be effectively integrated in end-to-end system designs, resulting in suboptimal performance.

This disclosure addresses at least this problem using a new type of codec proxy. For example, the codec proxy according to the systems and techniques described herein can efficiently and accurately estimate codec performance, together with partial derivatives (e.g., all partial derivatives) needed for optimization. The codec proxy can enable integration with backpropagation techniques (e.g., gradient backpropagation) used by neural network training tools. Experimental results discussed below demonstrate the accuracy of the estimation using comparison to the bit rates of the HEVC/H.265 video standard.

Various aspects of the present disclosure will be described with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform video compression and/or decompression (also referred to as video encoding and/or decoding, collectively referred to as video coding) using standards-based video coding and/or using machine learning techniques. Examples of standards-based and machine learning-based video coding systems are described with respect to FIG. 2 and FIG. 3.

Figure 2:
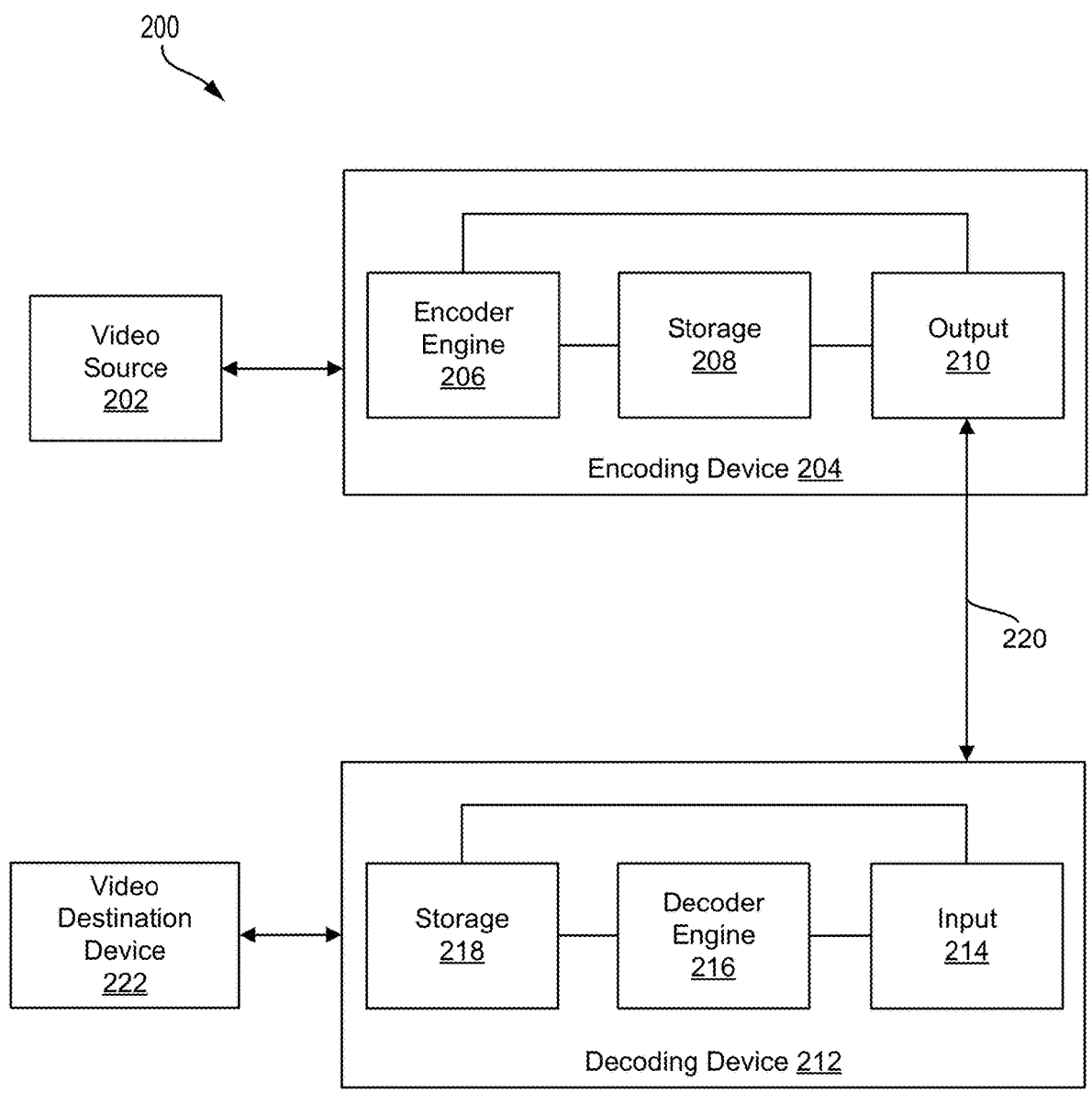
FIG. 2 is a block diagram illustrating an encoding device and a decoding device, in accordance with some examples.

FIG. 2 is a block diagram illustrating an example of a system 200 including an encoding device 204 and a decoding device 212 that can respectively encode and decode video data accordance with examples described herein. In some examples, the encoding device 204 and/or the decoding device 212 can include the SOC 100 of FIG. 1. The encoding device 204 may be part of a source device, and the decoding device 212 may be part of a receiving device (sometimes referred to as a client device). In some examples, the source device can also include a decoding device similar to the decoding device 212. In some examples, the receiving device can also include an encoding device similar to the encoding device 204. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, an Internet Protocol (IP) camera, a server device in a server system including one or more server devices (e.g., a video streaming server system, or other suitable server system), a head-mounted display (HMD), a heads-up display (HUD), smart glasses (e.g., virtual reality (VR) glasses, augmented reality (AR) glasses, or other smart glasses), or any other suitable electronic device.

The components of the system 200 can include and/or can be implemented using electronic circuits or other electronic hardware, which can include the SOC 100 and/or one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

While the system 200 is shown to include certain components, one of ordinary skill will appreciate that the system 200 can include more or fewer components than those shown in FIG. 2. For example, the system 200 can also include, in some instances, one or more memory devices other than the storage 208 and the storage 218 (e.g., one or more random access memory (RAM) components, read-only memory (ROM) components, cache memory components, buffer components, database components, and/or other memory devices), one or more processing devices (e.g., one or more CPUs, GPUs, NPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 200 can support one-way or two-way video transmission to support applications such as video conferencing, video streaming, video playback, video broadcasting, gaming, and/or video telephony.

In some examples, the encoding device 204 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, Versatile Video Coding (VVC) or ITU-T H.266, and/or other video coding standards. One or more of the video coding standards have extensions associated with other aspects of video coding. For instance, various extensions to HEVC deal with multi-layer video coding, including the range and screen content coding extensions, 3D video coding (3D-HEVC) and multiview extensions (MV-HEVC) and scalable extension (SHVC).

Many embodiments described herein can be performed using video codecs such as VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed, such as the machine learning based video coding described below. Accordingly, while the techniques and systems described herein may be described with reference to a particular video coding standard, one of ordinary skill in the art will appreciate that the description should not be interpreted to apply only to that particular standard.

Referring to FIG. 2, a video source 202 may provide the video data to the encoding device 204. The video source 202 may be part of the source device, or may be part of a device other than the source device. The video source 202 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 202 may include one or more input pictures. Pictures may also be referred to as "frames." A picture or frame is a still image that, in some cases, is part of a video. In some examples, data from the video source 202 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. In other instances, a picture may be monochrome and may only include an array of luma samples.

The encoder engine 206 (or encoder) of the encoding device 204 encodes the video data to generate an encoded video bitstream. In some examples, an encoded video bitstream (or "video bitstream" or "bitstream") is a series of one or more coded video sequences. According to HEVC, a coded video sequence (CVS) includes a series of access units (AUs) starting with an AU that has a random access point picture in the base layer and with certain properties (e.g., a RASL flag (e.g., NoRaslOutputFlag) equal to 1) up to and not including a next AU that has a random access point picture in the base layer and with certain properties. An AU includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 212 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 206 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to HEVC, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may be quantized by the encoder engine 206.

Once the pictures of the video data are partitioned into CUs, the encoder engine 206 predicts each PU using a prediction mode. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

As noted above, in some cases the encoder engine 206 and decoder engine 216 (described in more detail below) may be configured to operate according to VVC. According to VVC, a video coder (such as encoder engine 206 and/or decoder engine 216) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of the disclosure may also be applied to video coders configured to use quadtree partitioning, or other types of partitioning as well.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, $refIdx_0$ and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 204 can perform transformation and quantization. For example, following prediction, the encoder engine 206 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 206 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform (DCT), discrete sine transform (DST), an integer transform, a wavelet transform, other suitable transform function, or any combination thereof. In some cases, one or more block transforms (e.g., a kernel of size 32×32, 16×16, 8×8, 4×4, or other suitable size) may be applied to residual data in each CU. In some examples, a TU may be used for the transform and quantization processes implemented by the encoder engine 206. A given CU having one or more PUs may also include one or more TUs. As described in further detail below, the residual values may be transformed into transform coefficients using the block transforms, and may be quantized and scanned using TUs to produce serialized transform coefficients for entropy coding.

In some embodiments following intra-predictive or inter-predictive coding using PUs of a CU, the encoder engine 206 may calculate residual data for the TUs of the CU. The PUs may comprise pixel data in the spatial domain (or pixel domain). As previously noted, the residual data may correspond to pixel difference values between pixels of the unencoded picture and prediction values corresponding to the PUs. The encoder engine 206 may form one or more TUs including the residual data for a CU (which includes the PUs), and may transform the TUs to produce transform coefficients for the CU. The TUs may comprise coefficients in the transform domain following application of a block transform.

The encoder engine 206 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may be entropy encoded by the encoder engine 206. In some examples, the encoder engine 206 may utilize a predefined scan order to scan the quantized transform coefficients to produce a serialized vector that can be entropy encoded. In some examples, encoder engine 206 may perform an adaptive scan. After scanning the quantized transform coefficients to form a vector (e.g., a one-dimensional vector), the encoder engine 206 may entropy encode the vector. For example, the encoder engine 206 may use context adaptive variable length coding, context adaptive binary arithmetic coding, syntax-based context-adaptive binary arithmetic coding, probability interval partitioning entropy coding, or another suitable entropy encoding technique.

The output 210 of the encoding device 204 may send the NAL units making up the encoded video bitstream data over the communications link 220 to the decoding device 212 of the receiving device. The input 214 of the decoding device 212 may receive the NAL units. The communications link 220 may include a channel provided by a wireless network, a wired network, or a combination of a wired and wireless network. A wireless network may include any wireless interface or combination of wireless interfaces and may include any suitable wireless network, e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 204 may store encoded video bitstream data in storage 208. The output 210 may retrieve the encoded video bitstream data from the encoder engine 206 or from the storage 208. Storage 208 may include any of a variety of distributed or locally accessed data storage media. For example, the storage 208 may include a hard drive, a storage disc, flash memory, volatile or non-volatile memory, or any other suitable digital storage media for storing encoded video data. The storage 208 can also include a decoded picture buffer (DPB) for storing reference pictures for use in inter-prediction. In a further example, the storage 208 can correspond to a file server or another intermediate storage device that may store the encoded video generated by the source device. In such cases, the receiving device including the decoding device 212 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. The access may include a wireless channel (e.g., a Wi-Fi connection), a wired connection (e.g., DSL, cable modem, etc.), or a combination of both that is suitable for accessing encoded video data stored on a file server. The transmission of encoded video data from the storage 208 may be a streaming transmission, a download transmission, or a combination thereof.

The input 214 of the decoding device 212 receives the encoded video bitstream data and may provide the video bitstream data to the decoder engine 216, or to storage 218 for later use by the decoder engine 216. For example, the storage 218 can include a DPB for storing reference pictures for use in inter-prediction. The receiving device including the decoding device 212 can receive the encoded video data to be decoded via the storage 208. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 216 may decode the encoded video bitstream data by entropy decoding (e.g., using an entropy decoder) and extracting the elements of one or more coded video sequences making up the encoded video data. The decoder engine 216 may rescale and perform an inverse transform on the encoded video bitstream data. Residual data is passed to a prediction stage of the decoder engine 216. The decoder engine 216 predicts a block of pixels (e.g., a PU). In some examples, the prediction is added to the output of the inverse transform (the residual data).

The video decoding device 212 may output the decoded video to a video destination device 222, which may include a display or other output device for displaying the decoded video data to a consumer of the content. In some aspects, the video destination device 222 may be part of the receiving device that includes the decoding device 212. In some aspects, the video destination device 222 may be part of a separate device other than the receiving device.

In some embodiments, the video encoding device 204 and/or the video decoding device 212 may be integrated with an audio encoding device and audio decoding device, respectively. The video encoding device 204 and/or the video decoding device 212 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 204 and the video decoding device 212 may be integrated as part of a combined encoder/decoder (codec) in a respective device.

The example system shown in FIG. 2 is one illustrative example that can be used herein. Techniques for processing video data using the techniques described herein can be performed by any digital video encoding and/or decoding device. Although generally the techniques of the disclosure are performed by a video encoding device or a video decoding device, the techniques may also be performed by a combined video encoder-decoder, typically referred to as a "CODEC." Moreover, the techniques of the disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

As noted above, in some examples, the SOC 100 and/or components thereof may be configured to perform video compression and/or decompression (also referred to as video encoding and/or decoding, collectively referred to as video coding) using machine learning techniques. For instance, the encoding device 204 (or encoder) can be used to encode video data using a machine learning system with a deep learning architecture (e.g., by utilizing the NPU 108 of the SOC 100 of FIG. 1). In some cases, using deep learning architectures to perform video compression and/or decompression can increase the efficiency of video compression and/or decompression on a device. For example, the encoding device 204 can use a machine learning based video coding technique to compress video more efficiently, can transmit the compressed video to the decoding device 212, and the decoding device 212 can decompress the compressed video using the machine learning based techniques.

A neural network is an example of a machine learning system, and a neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. Various examples of neural network architectures are described below with respect to FIG. 4A-FIG. 5.

Figure 3:
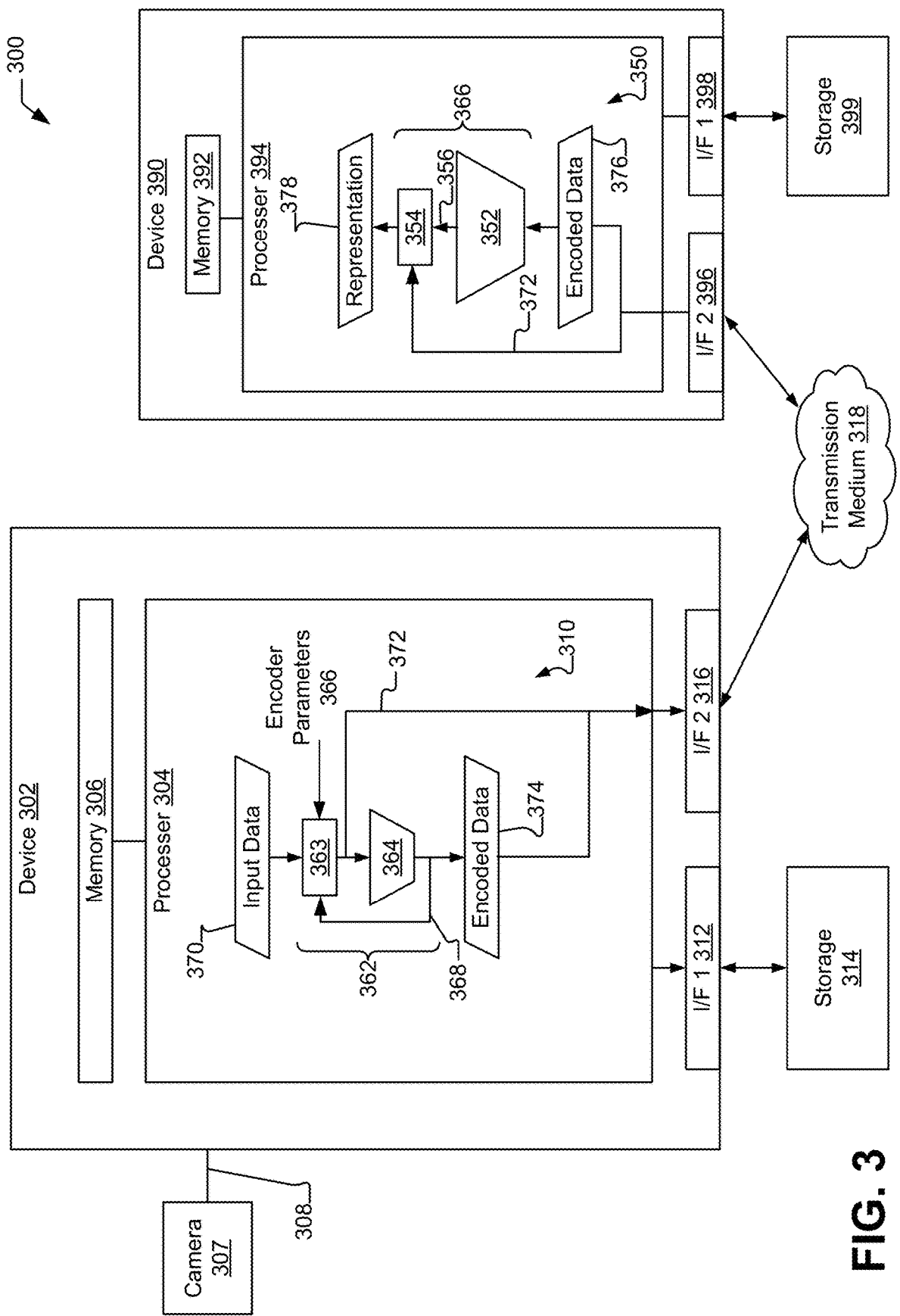
FIG. 3 is a diagram illustrating an example of a system including a device operable to perform image and/or video coding (encoding and decoding) using a machine learning coding system, in accordance with some examples.

FIG. 3 depicts a system 300 that includes a device 302 configured to perform video encoding using a machine learning coding system 310. The device 302 is coupled to a camera 307 and a storage medium 314 (e.g., a data storage device). In some implementations, the camera 307 is configured to provide the image data 308 (e.g., a video data stream) to the processor 304 for encoding by the machine learning coding system 310. In some implementations, the device 302 can be coupled to and/or can include multiple cameras (e.g., a dual-camera system, three cameras, or other number of cameras). In some cases, the device 302 can be coupled to a microphone and/or other input device (e.g., a keyboard, a mouse, a touch input device such as a touch-screen and/or touchpad, and/or other input device). In some examples, the camera 307, the storage medium 314, microphone, and/or other input device can be part of the device 302.

The device 302 is also coupled to a second device 390 via a transmission medium 318, such as one or more wireless networks, one or more wired networks, or a combination thereof. For example, the transmission medium 318 can include a channel provided by a wireless network, a wired network, or a combination of a wired and wireless network. The transmission medium 318 may form part of a packet-based network, such as a local area network, a wide-area network, or a global network such as the Internet. The transmission medium 318 may include routers, switches, base stations, or any other equipment that may be useful to facilitate communication from the source device to the receiving device. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

The device 302 includes one or more processors (referred to herein as "processor") 304 coupled to a memory 306, a first interface ("I/F 1") 312, and a second interface ("I/F 2") 316. The processor 304 is configured to receive image data 308 from the camera 307, from the memory 306, and/or from the storage medium 314. The processor 304 is coupled to the storage medium 314 via the first interface 312 (e.g., via a memory bus) and is coupled to the transmission medium 318 via the second interface 316 (e.g., a network interface device, a wireless transceiver and antenna, one or more other network interface devices, or a combination thereof).

The device 390 is similar to device 302 and includes one or more processors (referred to herein as "processor") 394 coupled to a memory 392, a first interface ("I/F 1") 396, and a second interface ("I/F 2") 398. The processor 392 is configured to receive data from the transmission medium 318 via the second interface 396, from the memory 306, and/or from the storage medium 314. The processor 394 is coupled to a storage medium 399 via the first interface 398 (e.g., via a memory bus) and is coupled to the transmission medium 318 via the second interface 396 (e.g., a network interface device, a wireless transceiver and antenna, one or more other network interface devices, or a combination thereof).

The processor 304 includes the machine learning encoding system 310. The machine learning coding system 310 includes an encoder portion 362. The encoder portion 362 is configured to receive input data 370 and to process the input data 370 to generate encoded data 374 at least partially based on the input data 370. In some cases, the machine learning encoding system 310 may include both an encoder portion 362 and a decoder portion, such as a decoder portion 366, shown here included in processor 394 of device 390. In some implementations, the machine learning coding system 310 can include one or more auto-encoders.

In some implementations, the encoder portion 362 of the machine learning coding system 310 is configured to perform lossy compression of the input data 370 to generate the encoded data 374, so that the encoded data 374 has fewer bits than the input data 370.

As shown, the encoder portion 362 of the machine learning coding system 310 can include a machine learning based preprocessor 363 and an encoder 364. As indicated above, some implementations of processor 304 include multiple processors and elements of the encoder portion 362 may be included on (e.g., performed by) different processors of the multiple processors. For example, the encoder 364 may be included on a custom processor, such as an application specific integrated circuit (ASIC).

In some cases, while video consumption is growing very rapidly, technical requirements are also becoming much more demanding, with the adoption of increasing resolutions, frame rates, and dynamic range. To provide the desired quality of service with the required data processing speeds, high throughputs, and low power consumption, current consumer video applications are best supported using custom hardware, such as ASICs that implement video compression standards like H.264/AVC and H.265/HEVC.

In some cases, updating an ASIC can be difficult and relatively slow, which can limit opportunities to add improvements to existing ASICs when new technologies and feature become available. Machine learning and neural network implementations can be used to help enhance the performance of existing ASICs using techniques referred to herein as video codec neural boosting. The machine learning based preprocessor 363 may be used to perform video codec neural boosting.

In some implementations, the machine learning based preprocessor 363 may be included on a machine learning accelerator or other processor optimized for performing machine learning/artificial intelligence processing. The machine learning based preprocessor 363 can include one or more convolutional neural networks (CNNs), one or more fully-connected neural networks, one or more gated recurrent units (GRUs), one or more Long short-term memory (LSTM) networks, one or more ConvRNNs, one or more ConvGRUs, one or more ConvLSTMs, one or more GANs, any combination thereof, and/or other types of neural network architectures. The machine learning based preprocessor 363 may receive, as input, encoder parameters 366 for configuring the encoder 364. The encoder parameters 366 may include parameters for configuring the operation of encoder 364, such as a quality parameter (e.g., a quality setting, parameter enabling/disabling an optimization, or other parameter for controlling how the encoder 364 operates). In some cases, the machine learning based preprocessor 363 may also receive, as input, codec internal data 368 from the encoder 364. The codec internal data 368 may include information or settings used to perform one or more steps of the encoding process, such as scaled transform coefficients, quantizer step size, etc. Based on the input (such as the input data 370, encoder parameters 366, and/or codec internal data 368), the machine learning based preprocessor 363 may generate codec boosting information 372, such as control side information and/or pixel side information, for improving the performance of the encoder 364. The machine learning based preprocessor 363 may pass the codec boosting information 372 along with the encoded data 374 to the decoder portion 366 for decoding. The machine learning based preprocessor 363 may pass the encoder parameters 366 along with the input data 370 through to the encoder 364 for encoding. In some cases, the encoder 364 may encode the input data 370 based on the encoder parameters 366 using existing video compression standards like H.264/AVC and H.265/HEVC and generate the encoded data 374. The encoded data 374 may be transmitted via the second interface 316 over the transmission medium 318 to device 390.

The processor 394 of device 390 includes a machine learning decoding system 350. The machine learning decoding system 350 includes the decoder portion 366. Device 390 may receive the encoded data 374 along with the codec boosting information 372 via the second interface 396 and pass the encoded data 374 and codec boosting information 372 to the decoder portion 366. In this example, the decoder portion 366 includes a decoder 352 and a machine learning based post-processor 354. The decoder portion 366 is configured to receive the encoded data 376 and process the encoded data 376 to generate a representation 378 based on the input data 370 which may be displayed, for example, to a user via a display (not shown). In some cases, the decoder 352 may decode the encoded data 376 using existing video compression standards like H.264/AVC and H.265/HEVC and generate decoded data 356. The decoded data 356 may be passed to the machine learning based post-processor 354. In some cases, the machine learning decoding system 350 may include both an encoder portion, such as encoder portion 362, along with the decoder portion 366.

The machine learning based post-processor 354 may receive the decoded data 356 along with the codec boosting information 372. The machine learning based post-processor 354 may enhance the decoded 356 using one or more trained machine learning algorithms based on the input codec boosting information 372 to generate the representation 378. In some examples, the machine learning based post-processor 354 of the decoder portion includes a neural network that may include one or more CNNs, one or more fully-connected neural networks, one or more GRUs, one or more Long short-term memory (LSTM) networks, one or more ConvRNNs, one or more ConvGRUs, one or more ConvLSTMs, one or more GANs, any combination thereof, and/or other types of neural network architectures. The processor 394 may be configured to send the representation 378 to the storage medium 399 or output the representation 378 for display on a display (not shown).

The components of the system 300 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 300 is shown to include certain components, one of ordinary skill will appreciate that the system 300 can include more or fewer components than those shown in FIG. 3. For example, the system 300 can also include, or can be part of a computing device that includes, an input device and an output device (not shown). In some implementations, the system 300 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 3.

In some implementations, the system 300 can be implemented locally by and/or included in a computing device. For example, the computing device can include a mobile device, a personal computer, a tablet computer, a virtual reality (VR) device (e.g., a head-mounted display (HMD) or other VR device), an augmented reality (AR) device (e.g., an HMD, AR glasses, or other AR device), a wearable device, a server (e.g., in a software as a service (SaaS) system or other server-based system), a television, and/or any other computing device with the resource capabilities to perform the techniques described herein.

As noted previously, some video coding systems utilize neural networks or other machine learning systems to compress video and/or image data. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
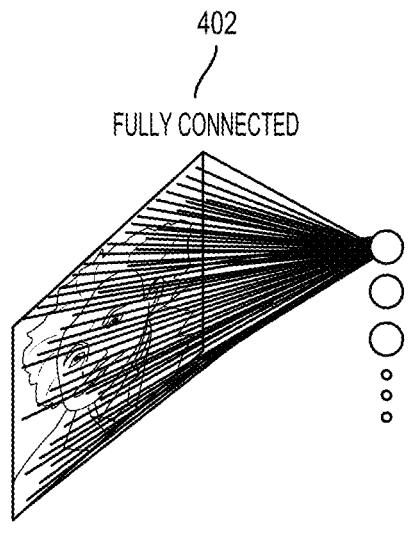
FIG. 4A-4D are diagrams illustrating examples of neural networks, in accordance with some examples.
Figure 4B:
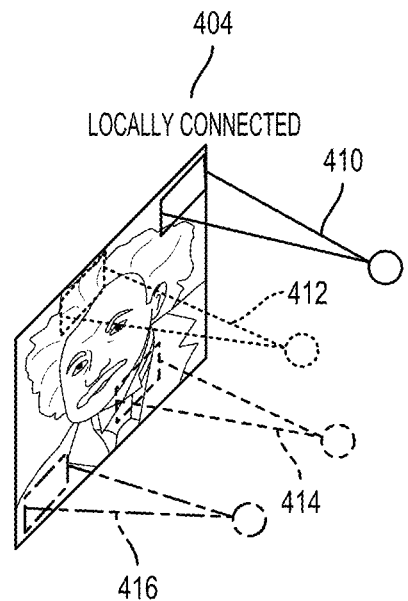

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
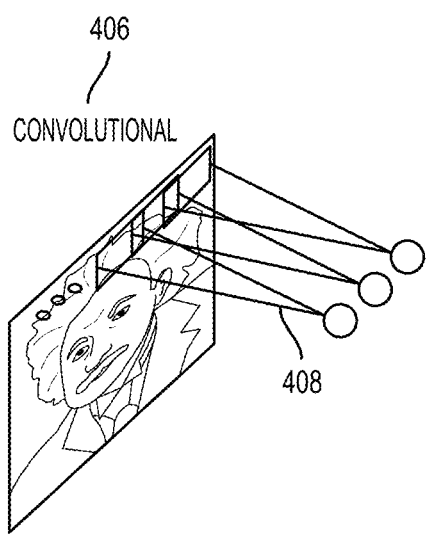

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful. Convolutional neural network 406 may be used to perform one or more aspects of video compression and/or decompression, according to aspects of the present disclosure.

Figure 4D:
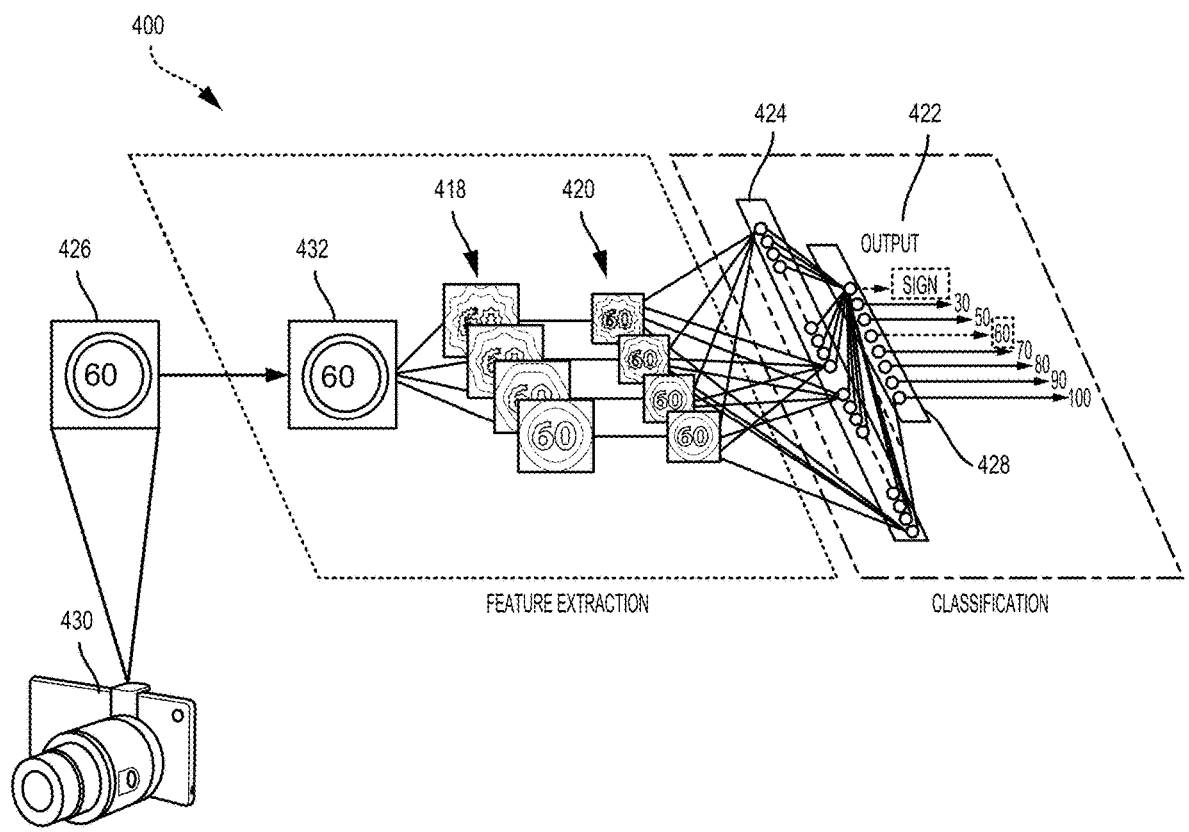

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory clonsumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 420) receiving input from a range of neurons in the previous layer (e.g., feature maps 418) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 5:
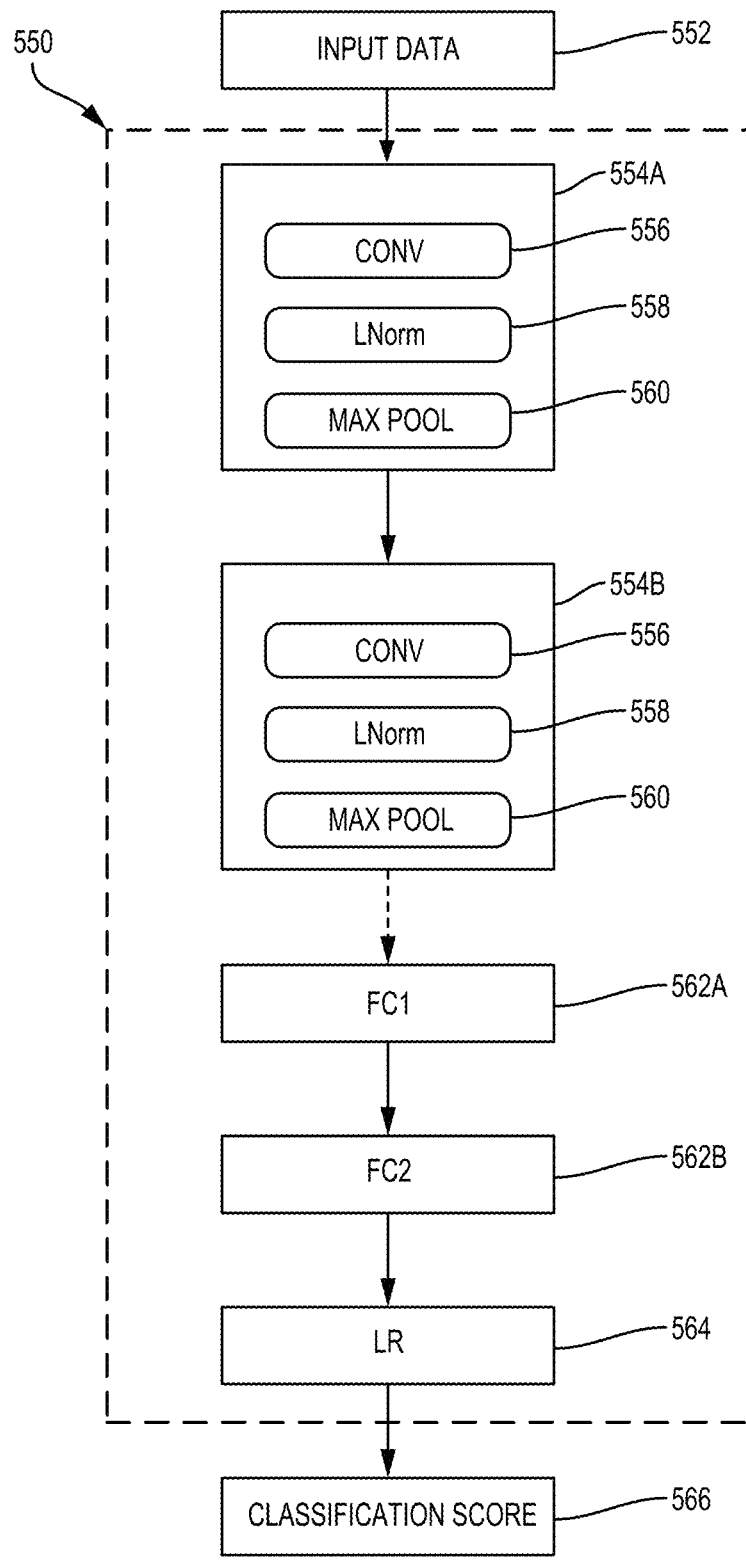
FIG. 5 is a diagram illustrating an example of a deep convolutional network, in accordance with some examples.

FIG. 5 is a block diagram illustrating an example of a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 556, a normalization layer (LNorm) 558, and a max pooling layer (MAX POOL) 560.

The convolution layers 556 may include one or more convolutional filters, which may be applied to the input data 552 to generate a feature map. Although only two convolution blocks 554A, 554B are shown, the present disclosure is not so limiting, and instead, any number of convolution blocks (e.g., blocks 554A, 554B) may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 550 may access other processing blocks that may be present on the SOC 100, such as sensor processor 114 and navigation module 120, dedicated, respectively, to sensors and navigation.

The deep convolutional network 550 may also include one or more fully connected layers, such as layer 562A (labeled "FC1") and layer 562B (labeled "FC2"). The deep convolutional network 550 may further include a logistic regression (LR) layer 564. Between each layer 556, 558, 560, 562A, 562B, 564 of the deep convolutional network 550 are weights (not shown) that are to be updated. The output of each of the layers (e.g., 556, 558, 560, 562A, 562B, 564) may serve as an input of a succeeding one of the layers (e.g., 556, 558, 560, 562A, 562B, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data including a feature from a set of features.

In some cases, conventional video compression techniques are designed empirically using human knowledge and intuition, neural networks and other machine learning tools rely on extensive amounts of training data, and efficient learning algorithms. Generally, there are two main classes of learning algorithms: (1) techniques based on discrete trial-and-error tests, with on-the-fly generation of optimization strategies, and (2) techniques that compute gradients of an objective (or loss) function, and use automatic differentiation, in the form of gradient backpropagation, to optimize system parameters. Both approaches have been successfully employed to solve practical problems, but the availability of derivatives of performance measures normally makes the second much more efficient, and consequently much more commonly used. For example, the second approach is the approach employed in well-known development tools like TensorFlow and PyTorch.

One issue for video coding systems is that several operations implemented by standard video codecs are nondifferentiable. In addition, video encoding systems sometimes include several stages, like adaptive deblocking filters, adaptive loop filters, etc., which may be linear and differentiable, but are quite complex and difficult to integrate into a training program.

In some cases, when a neural boosting system is designed (e.g., during the learning (or training) stages), a codec's compressed data and decoded video are not directly used, since only a measure of codec performance, together with its derivatives, is needed for optimization. Thus, the full codec is not needed if sufficiently good estimates of the measure and its derivatives can be obtained. A system designed for that purpose is referred to herein as a differentiable codec proxy.

As described above, entropy coding is one of the final stages (and in some cases the final stage) of encoding (compression), defining the value and number of bits to be added to the compressed data bitstream. Modern standards-based video encoding methods (e.g., VVC, HEVC, AV1, etc.) employ adaptive arithmetic coding to enable high quality compression performance. Bitstreams generated by adaptive arithmetic coding can only be encoded and decoded sequentially. For example, a data element can only be recovered by first decoding all previous elements, since the decoder needs to reach the same state the encoder had when it coded that element.

Figure 6A:
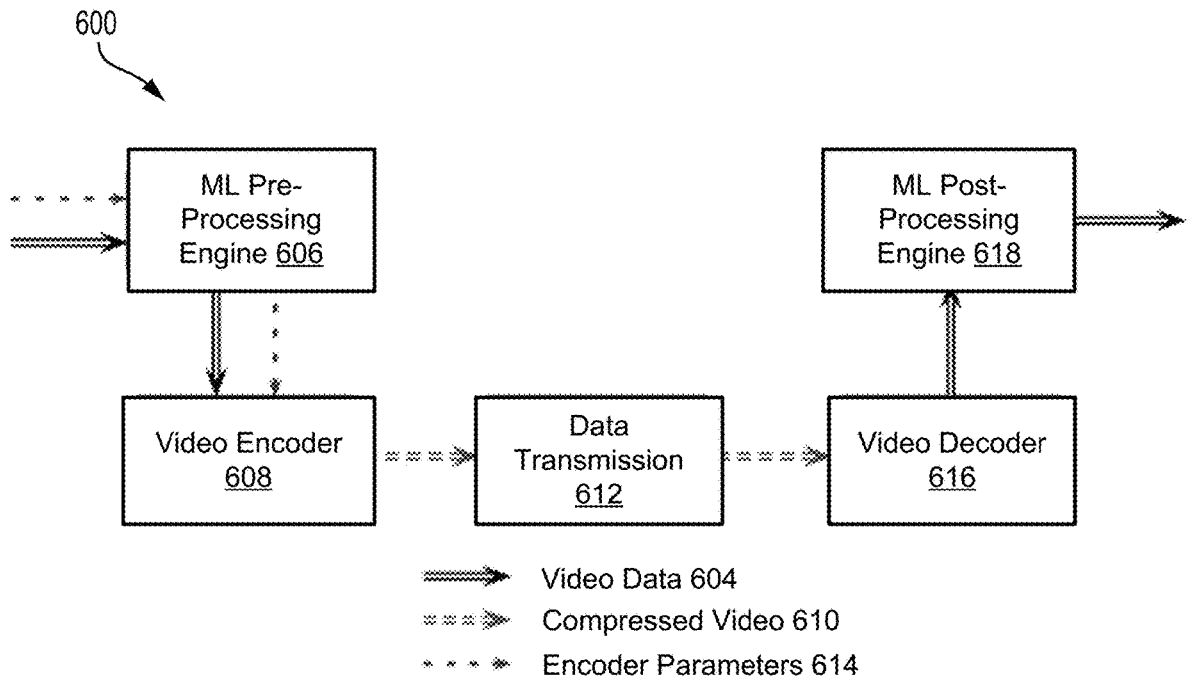
FIG. 6A and FIG. 6B are block diagrams illustrating example implementations of video codec neural boosting systems, in accordance with some examples.

FIG. 6A is a block diagram 600 illustrating an example implementation of a video codec neural boosting system, in accordance with aspects of the present disclosure. In the example video codec neural boosting system, a standard codec (e.g., VVC, HEVC, AVC, MPEG, AV1, or other similar codec) may be used when the codec with neural boosting is deployed within the video codec neural boosting system. Video data 604 may be input to a ML pre-processing engine 606. The ML pre-processing engine 606 may include one or more ML models. The one or more ML models may perform a variety of pre-processing tasks. Examples of the pre-processing tasks may include spatial up-sampling, temporal up sampling, quality optimizations, compression artifact removal, selective denoising, dynamic frame resizing, etc. Generally, these pre-processing tasks are directed at improving a quality of the video and/or video compression, without modifying the video encoder 608, which may be an existing standards compliant video encoder (e.g., VVCV, HEVC, AVC, MPEG, AV1, or other similar encoder). For example, one pre-processing task may be apply a ML model to perform selective denoising to remove types of noise that the encoder may be less capable of handling to improve compression of the video. As another example, a ML model may dynamically adjust encoder parameters 614 based on the input video data 604 to improve compression or quality of the video. The compressed video 610 may be transmitted 612 to a playback device (which may be any device, including the encoding device) for decoding by a video decoder 616. In some cases, the video decoder 616 may be a standard decoder (e.g., VVCV, HEVC, AVC, MPEG, AV1, or other similar decoder). Video data 604 output by the video decoder 616 may be input to a ML post-processing engine 618. The ML post-processing engine 618 may perform a variety of post-processing tasks. For example, the ML post-processing engine 618 may apply one or more ML models to dynamically add noise similar to the noise removed by the ML pre-processing engine 606 to the output video.

Figure 6B:
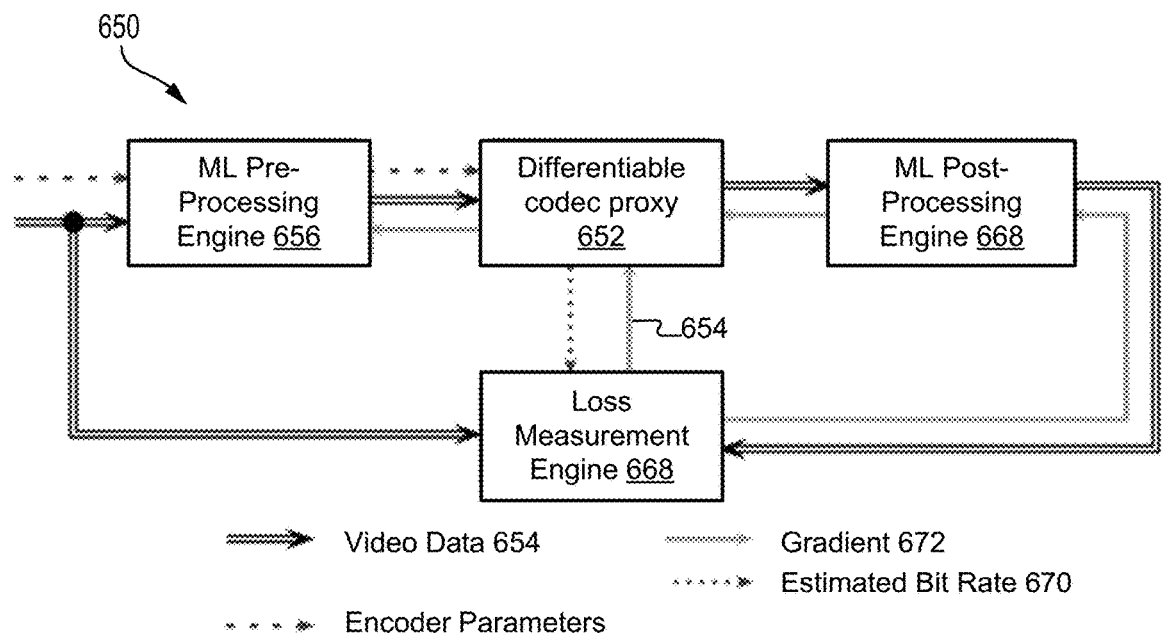

FIG. 6B is a block diagram 650 illustrating training of a video codec neural boosting system, in accordance with aspects of the present disclosure. In some cases, during the network learning (training) stages, the codec is replaced by the differentiable codec proxy 652 that enables gradient backpropagation 654. Video data 654 may be input to a ML pre-processing engine 656. In some cases, the ML pre-processing engine 656 may be a ML pre-processing engine 606 that is being trained. Output from the ML pre-processing engine 656 is input to the differentiable codec proxy 652. The differentiable codec proxy 652 may estimate a bit rate 670 of a compressed video that a video encoder, such as video encoder 608, may output. The differentiable codec proxy 652 may pass the estimated bit rate 670 to a loss measurement engine 668. The differentiable codec proxy 652 may also pass the video data 654 to the ML post-processing engine 668. In some cases, the ML post-processing engine 668 may be a ML post-processing engine 618 that is being trained. Output from the ML post-processing engine 668 may be passed to the loss measurement engine 668. The loss measurement engine 668 may compare the output from the ML post-processing engine 668 and estimated bit rate 670 to a ground truth reference to compute a loss function and gradient 672. This gradient 672 may be back propagated to the ML pre-processing engine 656, the differentiable codec proxy 652, and ML post-processing engine 668 for training.

In some cases, the efficacy of using the differentiable codec proxy 652 depends on the accuracy of the proxy estimations, which are defined by two factors, controlled by a chosen quality parameter referred here as QP. Bit rate R (which is related to QP) corresponds to the number of bits used by the encoder to compress a video frame or a block within the frame, divided by the number of pixels for normalization to bits per pixel. The bit rate decreases with increasing QP. Distortion D (which also relates to QP) is the measure of the difference between the original and the decoded video pixels, also normalized per pixel. Distortion can, for example, correspond to mean squared error or more complicated measures that approximate human subjective preferences. The distortion increases with increasing QP.

The bit rate and distortion can be combined into a single loss function, such as a loss function defined in Equation 1 below:

$$L(QP)=D(QP)+\lambda(QP)R(QP), \quad \text{Equation (1)}$$

where $\lambda(QP)$ is a Lagrange multiplier defined together with a quantization step, according to definitions of QP in the video standard.

One observation is that distortion measures are strongly dependent on the quantization step predefined by encoder parameter QP, and thus more predictable and easier to estimate. Bit rates, on the other hand, are more difficult to estimate because they are affected by complex statistical dependencies between many pixels.

Some video encoders, such as some HEVC/H.265 standard video encoders, implement what is known as a hybrid coding configuration, which combines predictive and transform coding. The components performing predictions and transformations are linear, and thus differentiable and easier to be directly integrated into the training process.

In some cases, some encoder elements are nonlinear and non-differentiable, such as those defined by the quantization and entropy coding processes. As used herein, non-differ-entiable may refer to a process that cannot be usefully differentiable for gradient backpropagation and/or loss measurement. For example, a function that rounds decimal numbers can be a basic form of quantization where input decimal numbers, such as 3.14 and 2.56 are rounded to 3. A derivative of output of the function across the range of input, such as a set of decimal numbers (assuming two decimal places) from 2.51 to 3.50 would simply be zero from 2.51 to 3.49 and then infinity for 3.50. Such differential output may not be useful for gradient backpropagation as there is no real gradient.

Figure 7:
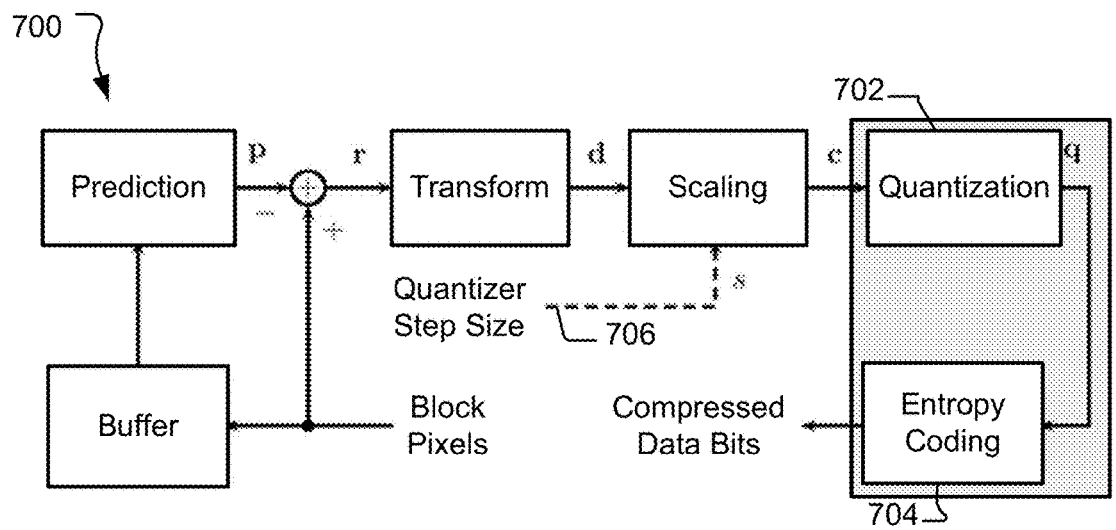
FIG. 7 is a diagram illustrating encoder elements of an example video encoder, in accordance with some examples.

FIG. 7 is a block diagram illustrating encoder elements of a video encoder 700 such as an HEVC or H.265 encoder, in accordance with aspects of the present disclosure. In some cases, certain encoder elements may be nonlinear and non-differentiable, such as a quantization 702 and entropy coding 704 processes. Assuming a block with dimensions M×N pixels, a linear transformation (commonly the discrete cosine transform) is applied to the residuals (e.g., the array of differences between predicted and actual pixel values). The resulting array of transform coefficients d_(m,n) are then scaled (divided by positive quantizer step size s 706), $$c_{m,n} = \frac{d_{m,n}}{s}, m = 0, 1, \ldots, M-1, n = 0, 1, \ldots, N-1,$$

and quantized according to Equation 2 below:

$$q_{m,n} = \text{sign}(c_{m,n})\lfloor|c_{m,n}|+\xi\rfloor, \quad \text{Equation (2)}$$

where $\xi$ is an offset that defines the type of dead-zone quantization.

The array of quantized transform coefficients $q_{m,n}$ is entropy coded, defining the number of bits to be used to encode the block. Since the quantization is not differentiable, any proxy estimation needs to use values from the array of scaled transform coefficients instead of $g_{m,n}$.

In some cases, the image coding differentiable proxy may estimate the number of bits as a function such as Equation 3 below:

$$B_l = \mu \sum_{m=0}^{M-1} \sum_{n=0}^{N-1} \log_2(|c_{m,n}|+1), \quad \text{Equation (3)}$$

where $\mu$ is a normalization constant.

However, current video coding standards employ sophisticated binary adaptive arithmetic coding, and they improve compression by processing the array in multiple passes, using coding contexts to exploit the statistical dependence among the elements of array $c_{m,n}$. Thus, any estimator like the above equation that does not account for the inter-coefficient dependences, will have very limited accuracy.

As noted above, in accordance with aspects of the present disclosure, systems and techniques are described herein that address at least this problem by defining a joint statistical model for all values in the array $c_{m,n}$, computing the maximum-likelihood estimation of the model parameters, and then using the model to estimate the number of bits. Such a process is differentiable.

Figure 8:
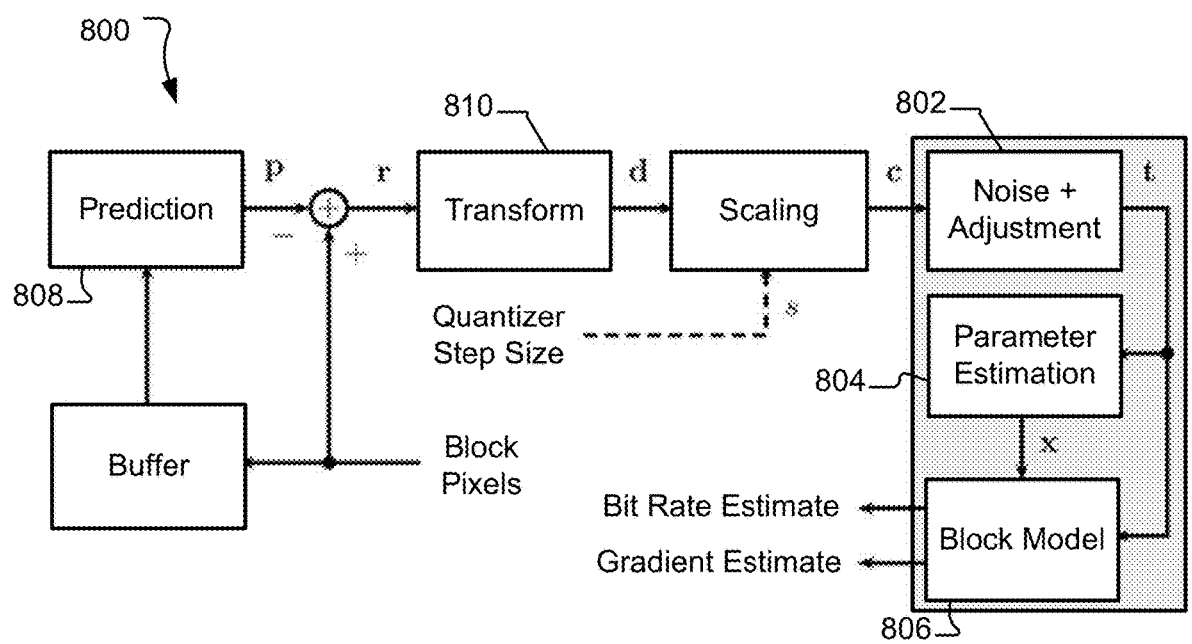
FIG. 8 is a block diagram illustrating elements of an example differentiable encoder proxy, in accordance with some examples.

FIG. 8 is a block diagram illustrating elements of a differentiable encoder proxy 800, in accordance with aspects of the present disclosure. In the differentiable encoder proxy 800, the encoder's (e.g., video encoder 700) non-differentiable quantization 702 and entropy coding 704 elements may be replaced by differentiable rate-estimation processes for the encoder proxy 800. The differentiable rate-estimation processes include a noise and adjustment process 802, a parameter estimation process 804, and a block mode 806. It is assumed that the proxy implementation approximates the main encoder decisions, such as selecting the proper prediction 808, block dimensions (M, N), and transform type 810.

Regularization and coefficient adjustment will now be described. For example, in some cases, quantization may change the scaled transform coefficients in a process that is similar to adding a random quantization noise $\eta$, which has roughly uniform distribution in the interval $[-0.5, 0.5]$. For that purpose, two arrays of random numbers with uniform distribution may be defined as $\eta_{m,n}^{(c)} \sim U(-\epsilon^{(c)}, \epsilon^{(c)})$, $\eta_{m,n}^{(t)} \sim U(-\epsilon(t), \epsilon^{(t)})$. In some cases, for the two arrays of random values, one may be chosen to be nonzero and the other can be chosen to be zero.

In some cases, this technique of adding random numbers is used when training end-to-end neural codecs to account for quantization of latent variable. However, in this example, it is included because it was empirically observed that it improves estimation accuracy, and because it can also be used as a form of regularization, since it avoids numerical instability during estimation when all transform coefficients have very small or zero magnitude.

Another factor is that, even though not required by the standard, video codecs often use the dead-zone quantizer such as Equation 2, which increases the probability of quantizing to zero values. To approximate this feature, an "adjustment" function is defined as Equation 4 below:

$$\upsilon(x; A, K) = \frac{x|x|^K}{A + |x|^K}, \quad \text{Equation (4)}$$

where x is the function's argument, and A and integer K are positive constants (parameters). In some cases, the adjustment function may be updated, for example, during a training process for the encoder proxy. For example, values for A and K, or x may be adjusted based on a loss function.

An example derivative of Equation 4 is illustrated in Equation 5 below:

$$\gamma(x; A, K) \stackrel{def}{=} \frac{d\upsilon(x; A, K)}{dx} = 1 + \frac{A\left[(K-1)|x|^K - A\right]}{(A + |x|^K)^2} \quad \text{Equation (5)}$$

Figure 9:
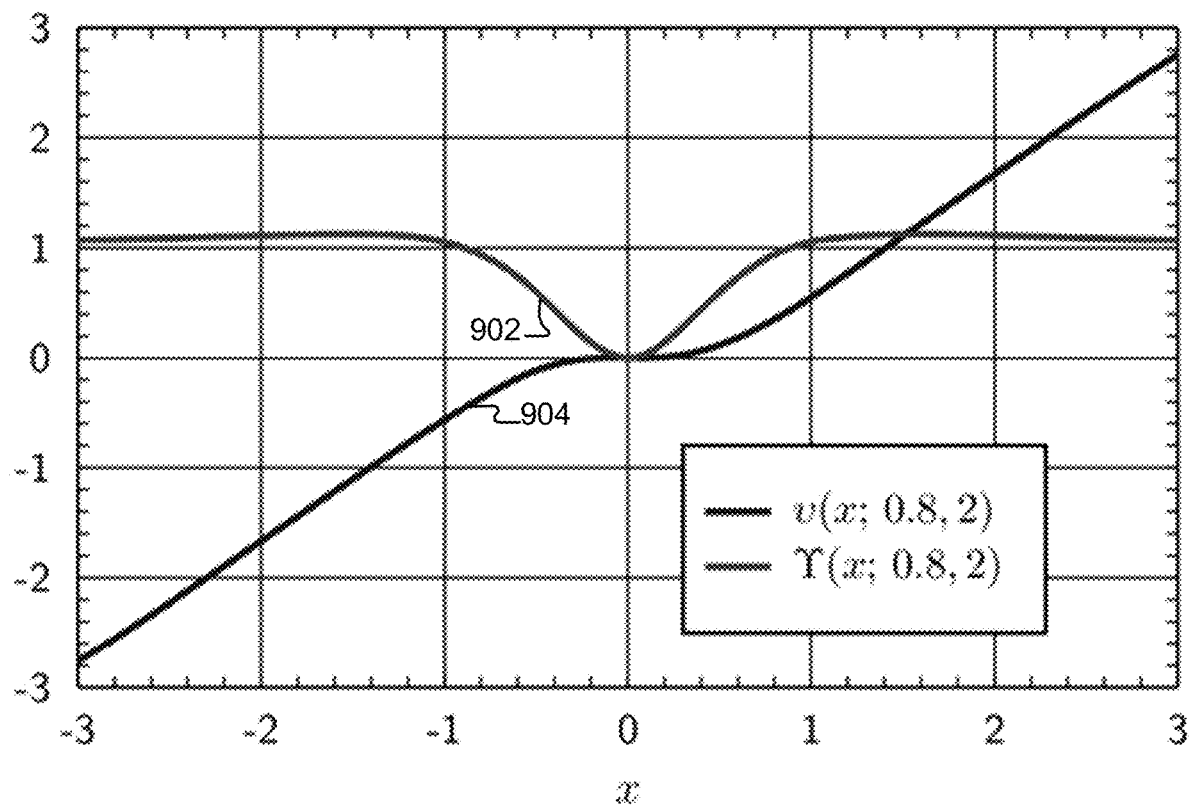
FIG. 9 is a graph plotting an example adjustment function and derivative of the adjustment function, in accordance with some examples.

FIG. 9 is a graph plotting an example adjustment function and derivative of the adjustment function 900, in accordance with aspects of the present disclosure. In this example, FIG. 9 shows a first line 902 corresponding to Equation 4, given $$\upsilon(x; 0.8, 2) = \frac{x^3}{0.8 + x^2}, \quad \gamma(x; 0.8, 2) = 1 + \frac{0.8(x^2 - 0.8)}{(0.8 + x^2)^2}.$$

From these definitions, random variables may be defined in the statistical model to be used for bit rate estimation, such as shown in Equation 6 below:

$$c'_{m,n} \stackrel{def}{=} c_{m,n} + \eta_{m,n}^{(c)}, \quad t_{m,n} \stackrel{def}{=} \upsilon(c'_{m,n}; A, K), \quad \text{Equation (6)}$$

$$t'_{m,n} \stackrel{def}{=} t_{m,n} + \eta_{m,n}^{(t)}$$

A second line 904 shown in FIG. 9 corresponds to a derivative of Equation 4 (e.g., Equation 5).

A definition of the statistical model and parameter estimation will now be discussed. For example, in some cases, the statistical model may be defined with a vector x containing the model's three parameters and may be based on one or more assumptions. A first assumption for which the statistical model may be defined is that all elements of array $t_{m,n}$ are independent and have Laplace distribution with zero mean and scales $s_{m,n}(x)$. For instance, the probability distribution functions for the elements of the array $t_{m,n}$ may be described by Equation 7 below:

$$f(t_{m,n}; s_{m,n}(x)) \stackrel{def}{=} \frac{1}{2s_{m,n}(x)} \exp\left(-\frac{|t_{m,n}|}{s_{m,n}(x)}\right) \quad \text{Equation (7)}$$

To simplify notation, the Laplace distribution may be parameterized by scale s, instead of the standard deviation $\sigma = \sqrt{2}s$.

A second assumption for which the statistical model may be defined is that the array of Laplace distribution scales is defined by Equation 8 as follows:

$$s_{m,n}(x) \stackrel{def}{=} \exp(-x_0 - x_1 m - x_2 n). \quad \text{Equation (8)}$$

In some cases, the probability distributions of transform coefficients can be well approximated by the Laplace distribution. The fast decay of scales with frequency (defined by indexes m and n) is also well-known. In some cases, choosing an exponential function to model the decay greatly simplifies the derivative formulas and their computations. In some cases, values for indexes m and n be updated, for example, during a training process for the encoder proxy. For example, indexes m and n may be adjusted based on a loss function during training.

Model parameter estimation will now be described. For example, given the array $t_{m,n}$ of modified transform coefficients in a block, a maximum likelihood (ML) method can be used to estimate the parameter vector x. As explained above, prediction accuracy can be increased and numerical instability can be avoided by replacing the array $t_{m,n}$ with the array $t_{m,n}'$ defined in Equation 6. To simplify the notation, Equations 9 and 10 can be defined as follows:

$$\rho_{m,n}(x) \stackrel{def}{=} \frac{1}{s_{m,n}(x)} = \exp(x_0 + x_1 m + x_2 n) \quad \text{Equation (9)}$$

$$w_{m,n} \stackrel{def}{=} |t'_{m,n}| \quad \text{Equation (10)}$$

From Equations 6, 8, 9, and 10, it can be shown that the negative of the log-likelihood (e.g., the function to be minimized to obtain the optimal parameter vector), such as illustrated in Equation 11 below:

Equation (11)

$$L(x) =$$

$$-MN\left[x_0 + \left(\frac{M-1}{2}\right)x_1 + \left(\frac{N-1}{2}\right)x_2\right] + \sum_{m=0}^{M-1}\sum_{n=0}^{N-1} w_{m,n} \rho_{m,n}(x)$$

The optimal solution, corresponding to maximum-likelihood parameters, $$x^* \stackrel{def}{=} \underset{x}{\arg\min}\, L(x)$$

is defined by setting a gradient of Equation 11 to zero, which can be shown to correspond to a first set of equations:

$$\sum_{m=0}^{M-1}\sum_{n=0}^{N-1} w_{m,n}\rho_{m,n}(x^*) = MN,$$

$$\sum_{m=0}^{M-1}\sum_{n=0}^{N-1} m\ w_{m,n}\rho_{m,n}(x^*) = \frac{MN(M-1)}{2},$$

$$\sum_{m=0}^{M-1}\sum_{n=0}^{N-1} n\ w_{m,n}\rho_{m,n}(x^*) = \frac{MN(N-1)}{2}.$$

No closed-form solution to this first set of equations are known, but a solution can be efficiently computed using Newton's method iterations, defined by Equation 12 below:

$$x \leftarrow x - \xi[H(x)]^{-1}\nabla L(x), \quad \text{Equation (12)}$$

where $0 < \xi \le 1$ is a multiplicative factor added to guarantee convergence.

In Equation 12, the gradient is:

$$\nabla L(x) = \begin{bmatrix} \sum_{m=0}^{M-1}\sum_{n=0}^{N-1} w_{m,n}\rho_{m,n}(x) - MN \\ \sum_{m=0}^{M-1}\sum_{n=0}^{N-1} m\ w_{m,n}\rho_{m,n}(x) - \frac{MN(M-1)}{2} \\ \sum_{m=0}^{M-1}\sum_{n=0}^{N-1} n\ w_{m,n}\rho_{m,n}(x) - \frac{MN(N-1)}{2} \end{bmatrix}$$

and the corresponding Hessian matrix is:

$$H(x) = \begin{bmatrix} \sum_{m=0}^{M-1}\sum_{n=0}^{N-1} w_{m,n}\rho_{m,n}(x) & \sum_{m=0}^{M-1}\sum_{n=0}^{N-1} m\ w_{m,n}\rho_{m,n}(x) & \sum_{m=0}^{M-1}\sum_{n=0}^{N-1} n\ w_{m,n}\rho_{m,n}(x) \\ \sum_{m=0}^{M-1}\sum_{n=0}^{N-1} m\ w_{m,n}\rho_{m,n}(x) & \sum_{m=0}^{M-1}\sum_{n=0}^{N-1} m^2 w_{m,n}\rho_{m,n}(x) & \sum_{m=0}^{M-1}\sum_{n=0}^{N-1} mn\ w_{m,n}\rho_{m,n}(x) \\ \sum_{m=0}^{M-1}\sum_{n=0}^{N-1} n\ w_{m,n}\rho_{m,n}(x) & \sum_{m=0}^{M-1}\sum_{n=0}^{N-1} mn\ w_{m,n}\rho_{m,n}(x) & \sum_{m=0}^{M-1}\sum_{n=0}^{N-1} n^2 w_{m,n}\rho_{m,n}(x) \end{bmatrix}$$

In some cases, the output gradient of Equation 12 may be determined and used for back propagation as a part of a loss function, for example by a loss measurement system, such as loss measurement engine 668 of FIG. 6, for training a pre-processor, such as ML pre-processing engine 656 or the differentiable codec proxy, such as differentiable codec proxy 652.

Some observations about the practical use of Newton's method are that:

(1) As mentioned before, the use of the exponential function simplifies the derivative formulas, and also their computations, since several factors appear repeatedly in the equations above. For example, arrays with factors $\{w_{m,n}, mw_{m,n}, nw_{m,n}, m^2w_{m,n}, n^2w_{m,n}, mnw_{m,n}\}$ can be computed once and reused in each iteration.

(2) Divergence can be avoided by using adaptive step-correction methods like, for each iteration, trying first $\xi=1$, and halving its value if $L(x)$ is not decreasing.

(3) Since the Hessian matrix is symmetric, the Newton method step size in Equation 12 is more efficiently computed using the Cholesky matrix factorization instead of the inverse.

Experimental results show that quadratic convergence starts after just 2 or 3 iterations, when a reasonably good initial solution is used. For example, in experiments using 8×8 DCT coefficients, the initial solution below can be used:

$$x_0 = \begin{bmatrix} -\ln\left(\frac{1}{MN}\sum_{m=0}^{M-1}\sum_{n=0}^{N-1} w_{m,n}\right) \\ 0.15 \\ 0.15 \end{bmatrix}.$$

Bit rate estimation will now be described. As shown in FIG. 7, entropy coding 704 in video compression is applied to integers obtained by quantization, with a probability value assigned to each quantization interval. In some cases, to approximate this stage with a differentiable approach the relaxation technique developed for training end-to-end neural image codecs may be employed, where fixed sets of intervals used for quantization and probability computation are replaced by interval surrounding the coefficient values.

With this approach, the probability values corresponding to the values to be used for entropy coding may be defined by Equation 13 below:

$$p_{m,n}(x^*) \stackrel{\text{def}}{=} F(t_{m,n} + 0.5; s_{m,n}(x^*)) - F(t_{m,n} - 0.5; s_{m,n}(x^*)) \quad \text{Equation (13)}$$

In Equation 13, the cumulative distribution of the Laplace distribution may be defined as defined as Equation 14 below:

$$F(t;s) \stackrel{\text{def}}{=} \begin{cases} \frac{1}{2} e^{t/s}, & t < 0, \\ 1 - \frac{1}{2} e^{-t/s}, & t \ge 0. \end{cases} \quad \text{Equation (14)}$$

With these definitions, the estimate of the number of bits used to code a block may be defined by Equation 15 below:

$$B = a\sum_{m=0}^{M-1}\sum_{n=0}^{N-1} -\log_2(p_{m,n}(x^*)), \quad \text{Equation (15)}$$

where $\alpha$ is a normalization constant.

In some cases, the estimated number of bits may be generated, for example, by a differentiable codec proxy, such as differentiable codec proxy 652 of FIG. 6. The estimated number of bits may be used, for example, by a loss measurement system, such as loss measurement engine 668, for back propagation.

Partial derivative computations will now be described. For training neural networks, a gradient of the estimated number of bits (e.g., the array of partial derivatives), may be used according to Equation 16 below:

$$\gamma_{m,n} \stackrel{def}{=} \frac{\partial B}{\partial c_{m,n}}. \qquad \text{Equation (16)}$$

In some cases, the array of partial derivatives can be computed using the automatic differentiation tools available in software tools (e.g., PyTorch), with the caveat that, to enable backpropagation, Equation 12 may need to be replaced with $x_{i+1}=x_i-\xi_l[H(x_l)]^{-1}\nabla L(x_l)$, l=0,1,2, . . . , creating a converging sequence of solutions and allowing the software to create the proper links for automatic differentiations. Such a technique may increase computational complexity because it adds multiple stages of gradient computation. A more efficient implementation can be performed if automatic differentiation are removed from the maximum-likelihood optimization and use direct computations of those partial derivatives using the optimal solution.

For computing those derivatives, it can be defined that $$\rho^*_{m,n} \stackrel{def}{=} \rho_{m,n}(x^*), \text{ and } y^*_{m,n,k} = \frac{\partial x_k}{\partial c_{m,n}}\bigg|_{x_k=x^*_k}.$$

or the partial derivative computation, the optimality condition $\nabla L(x^*)=0$ may correspond to the following set of MN vector equations:

$$\begin{bmatrix} y^*_{m,n,0} \\ y^*_{m,n,1} \\ y^*_{m,n,2} \end{bmatrix} = -\rho^*_{m,n} \frac{\partial w_{m,n}}{\partial c_{m,n}} [H(x^*)]^{-1} \begin{bmatrix} 1 \\ m \\ n \end{bmatrix},$$

where $$\frac{\partial w_{m,n}}{\partial c_{m,n}} = \text{sign}(t'_{m,n})\gamma(c'_{m,n}; A, K).$$

Using such results, Equation 16 can be expanded as:

$$\frac{\partial B}{\partial c_{i,j}} = -\frac{a}{\ln(2)}\sum_{m=0}^{M-1}\sum_{n=0}^{N-1}\frac{1}{p_{m,n}(x^*)}\frac{\partial p_{m,n}(x^*)}{\partial c_{i,j}} \qquad \text{Equation (17)}$$

into the equations defining the gradient computation:

$$\frac{\partial B}{\partial c_{i,j}} = -\frac{\alpha}{2\ln(2)}\sum_{m=0}^{M-1}\sum_{n=0}^{N-1}\frac{\rho^*_{m,n}}{p_{m,n}(x^*)}[g_{m,n,i,j}(t_{m,n}+0.5) - g_{m,n,i,j}(t_{m,n}-0.5)],$$

where $$g_{m,n,i,j}(\tau) = \exp(-|\tau|\rho^*_{m,n})\left[\tau(y^*_{i,j,0} + y^*_{i,j,1}m + y^*_{i,j,2}n) + \frac{\partial t_{m,n}}{\partial c_{i,j}}\right].$$

Then, from Equations 5 and 6, Equation 17 can be derived as follows:

$$\frac{\partial t_{m,n}}{\partial c_{i,j}} = \begin{cases} \gamma(c'_{m,n}; A, K) & m=i, n=j, \\ 0, & \text{otherwise}. \end{cases} \qquad \text{Equation (18)}$$

In some aspects, Equation (17) can be simplified by collecting sum of terms that vary with indexes m, n. For example, the following functions can be defined:

$$\psi_{m,n}(b) = \frac{\rho^*_{m,n}\exp(-\rho^*_{m,n}|t_{m,n}+b|)}{p_{m,n}(x^*)}, \qquad \text{Equation (19)}$$

$$\Psi_{m,n}(b) = (t_{m,n}+b)\psi_{m,n}(b), \qquad \text{Equation (20)}$$

and vector z such that:

$$z = [H(x^*)]^{-1}\begin{bmatrix} \sum_{m=0}^{M-1}\sum_{n=0}^{N-1}[\Psi_{m,n}(0.5) - \Psi_{m,n}(-0.5)] \\ \sum_{m=0}^{M-1}\sum_{n=0}^{N-1}m[\Psi_{m,n}(0.5) - \Psi_{m,n}(-0.5)] \\ \sum_{m=0}^{M-1}\sum_{n=0}^{N-1}n[\Psi_{m,n}(0.5) - \Psi_{m,n}(-0.5)] \end{bmatrix} \qquad \text{Equation (21)}$$

Accordingly, Equation (17) can correspond to:

$$\frac{\partial B}{\partial c_{m,n}} = \frac{\alpha\gamma(c'_{m,n}; A, K)}{2\ln(2)} \qquad \text{Equation (22)}$$

$$\{\text{sign}(t'_{m,n})\rho^*_{m,n}(z_0 + m\ z_1 + n\ z_2) - [\psi_{m,n}(0.5) - \psi_{m,n}(-0.5)]\}$$

Illustrative examples of experimental validation will now be described. For example, the systems and techniques described herein may be tested by modifying the reference implementation of the HEVC/H.265 video compression standard, called HM version 20.0, to output the DCT coefficients used by the encoder in the low-delay configuration, luma transform dimension restricted to 8×8 blocks, QP values 22, 27, 32, and 37, and the number of bits used in each case.

The compression was applied to 201 frames of 10 HD test videos, and only the luma coefficients in inter frames (e.g., intra frame excluded) were saved. For each frame, the bit rate was estimated using $\epsilon^{(c)}=0.5$, $\epsilon^{(r)}=0$ in eq. (5), A=1, K=2 in Equation 5, and $\alpha=1$ was initially used in Equation 15. After comparing the estimated bit rates with the actual bit rates the parameter $\alpha$ was calibrated to $\alpha=5/3$, which is the value used in all results presented next.

In some cases, the choice of parameter $\alpha$ is not critical, since during neural network training the bit rate estimates are multiplied by a constant, as in Equation 1, and to obtain the best results several constant values need to be tested. Similarly, the estimator calibrated form HEVC can be used with AVC by testing new scaling factors.

The results obtained using the systems and techniques described herein may be evaluated by measuring the ratio of the estimated frame bit rate with the corresponding value from the HM software. FIGS. 10-13 show histograms of those ratios, computed on 2,000 frames of the test videos, each figure showing results for QP=22, 27, 32, and 37. As expected, results are more peaked on low QP, which corresponds to high-rate cases, where per coefficient factor dominate. The histograms become more spread as QP value increases, and well-constrained errors can be observed even for maximum QP=27.

Figure 10:
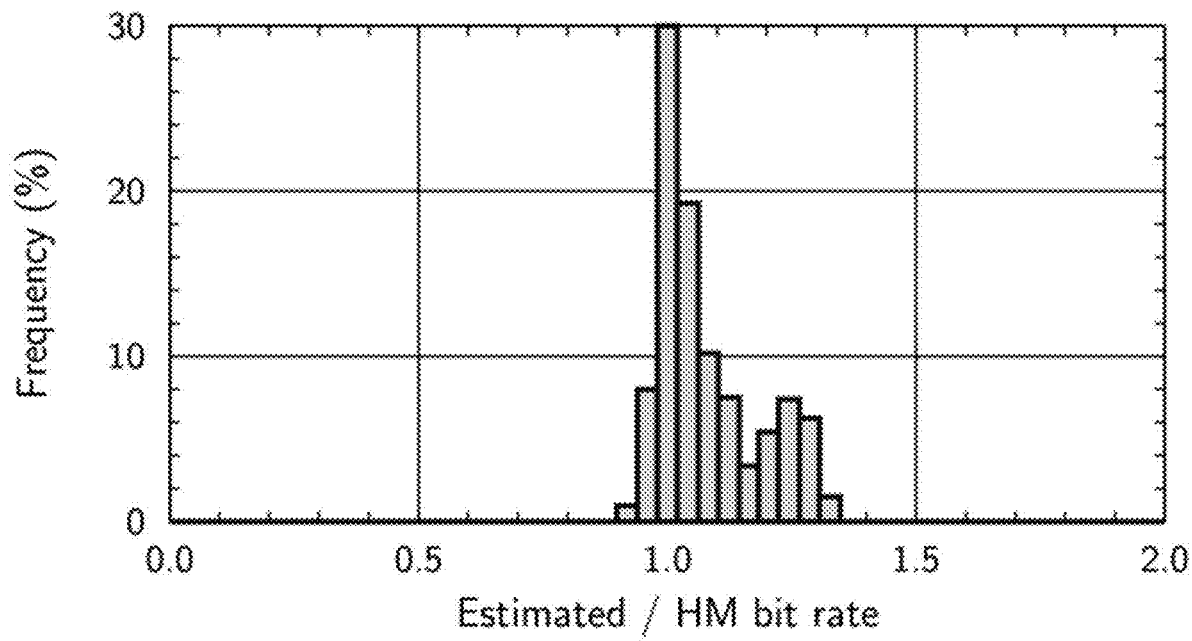
FIG. 10-FIG. 16 are histograms of example ratios between frame bit rates, in accordance with some examples.

FIG. 10 is a histogram of ratios between frame bit rates estimated using the systems and techniques described herein and the bit rates using by the HM software (HEVC/H.265 reference implementation) and QP=22.

Figure 11:
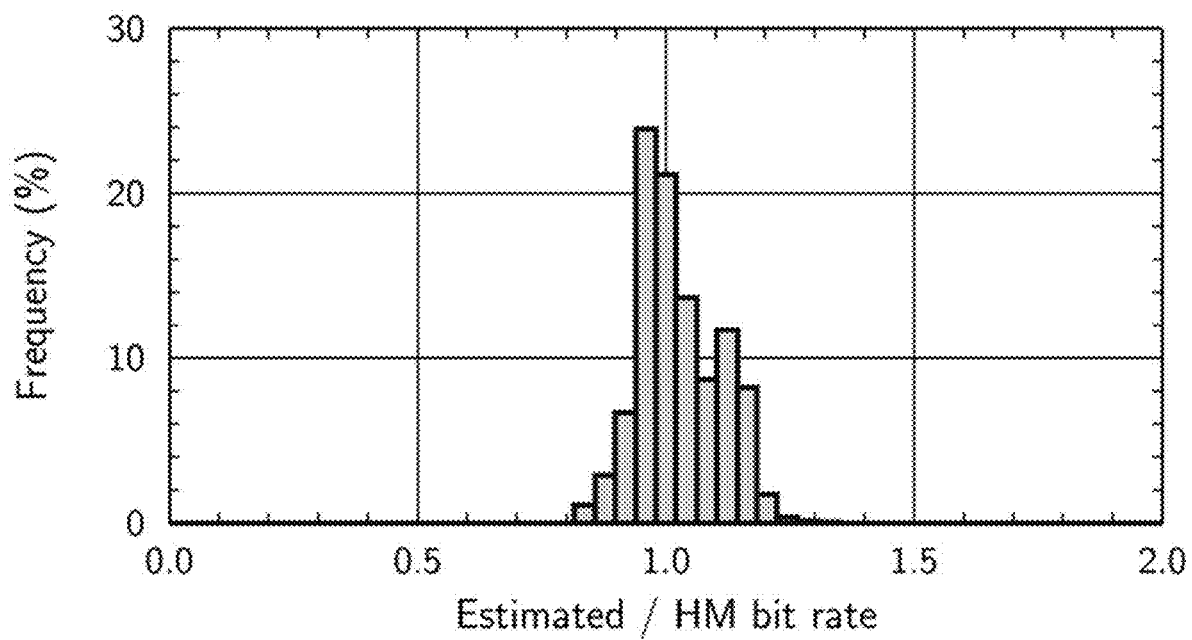

FIG. 11 is a histogram of ratios between frame bit rates estimated using the systems and techniques described herein and the bit rates using by the HM software (HEVC/H.265 reference implementation) and QP=27.

Figure 12:
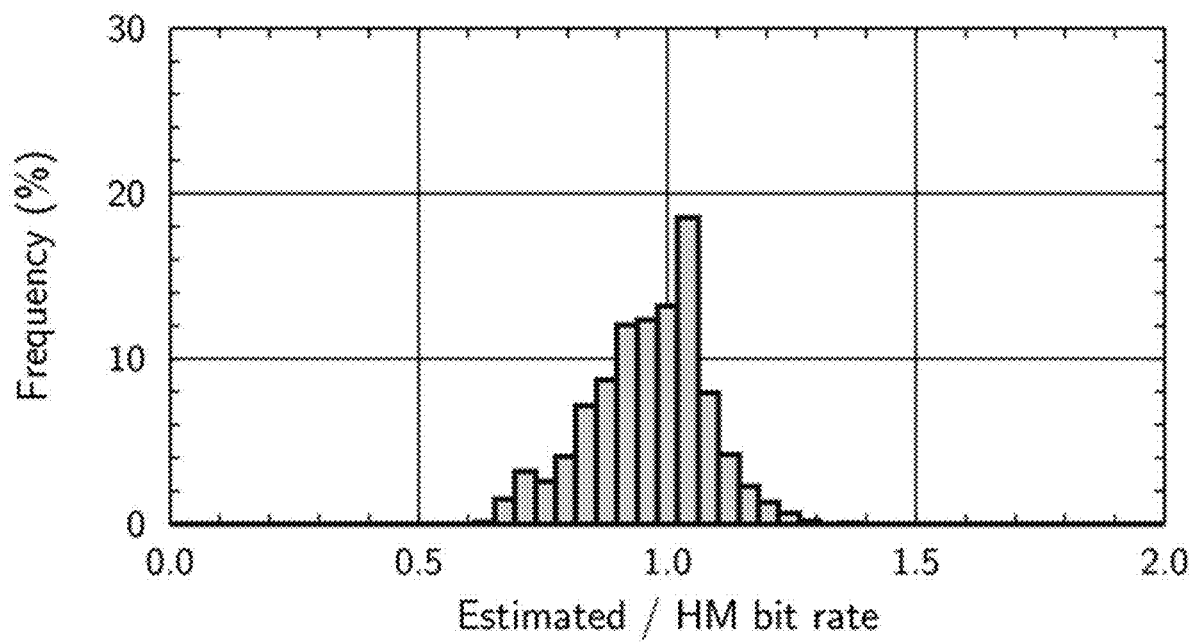

FIG. 12 is a histogram of ratios between frame bit rates estimated using the systems and techniques described herein and the bit rates using by the HM software (HEVC/H.265 reference implementation) and QP=32.

Figure 13:
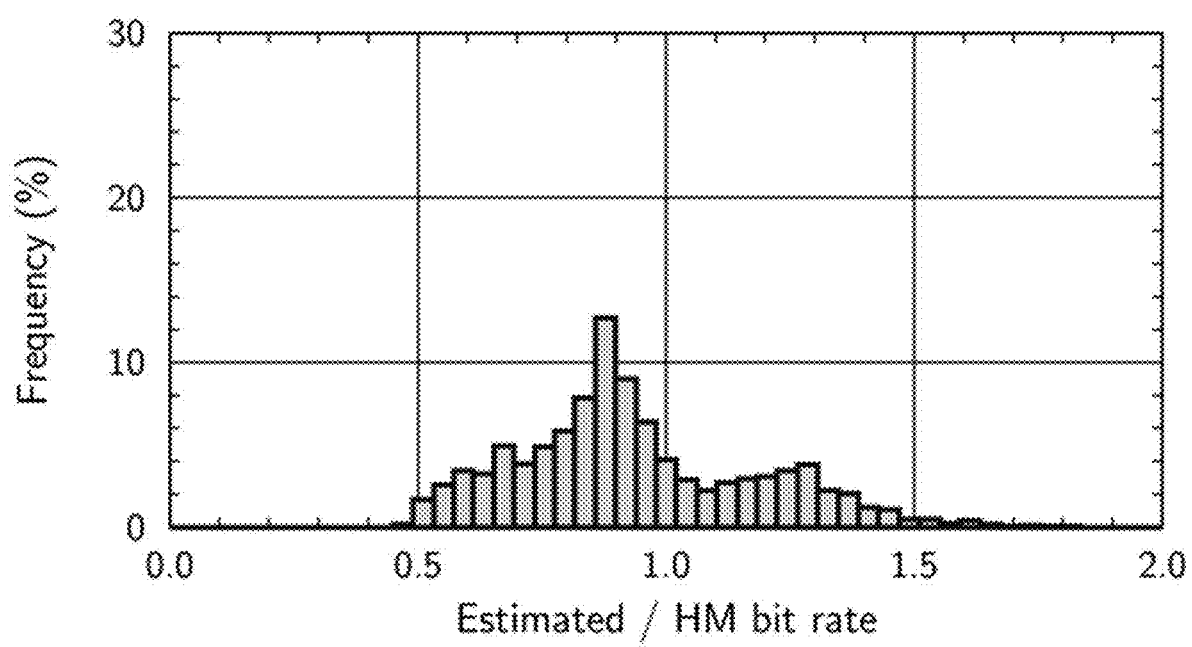

FIG. 13 is a histogram of ratios between frame bit rates estimated using the systems and techniques described herein and the bit rates using by the HM software (HEVC/H.265 reference implementation) and QP=37.

Figure 14:
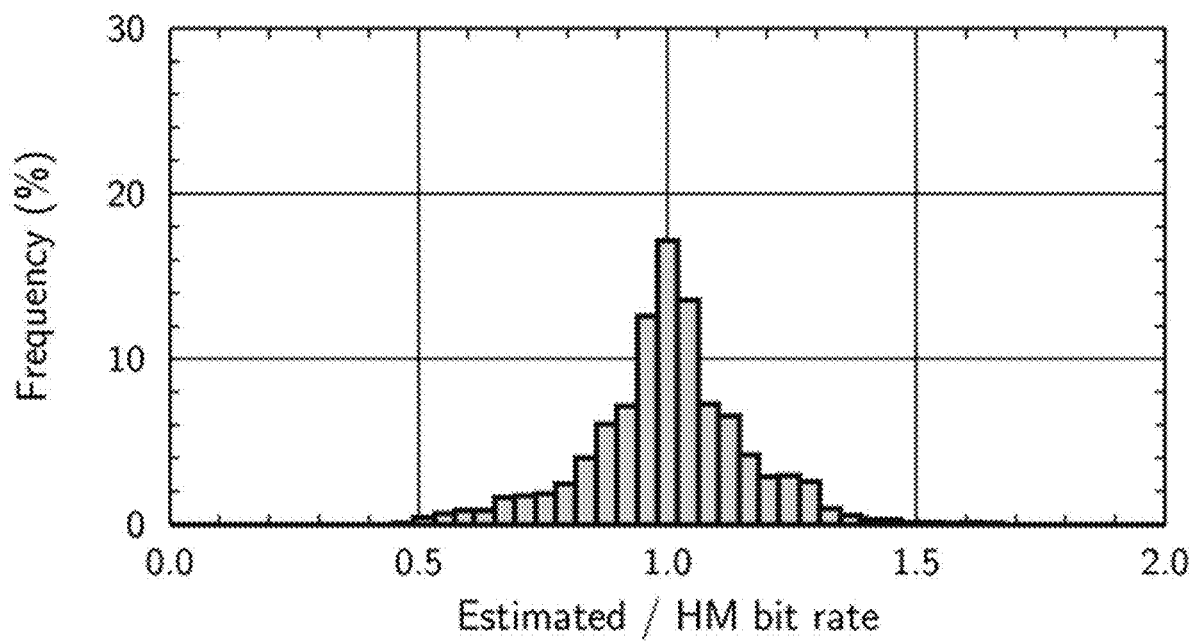

FIG. 14 is a histogram of ratios between frame bit rates estimated using the technique for bit rate estimation for enhancing video coding using machine learning and the bit rates using by the HM software (HEVC/H.265 reference implementation), combined results for QP=22, 27, 32, and 37.

Figure 15:
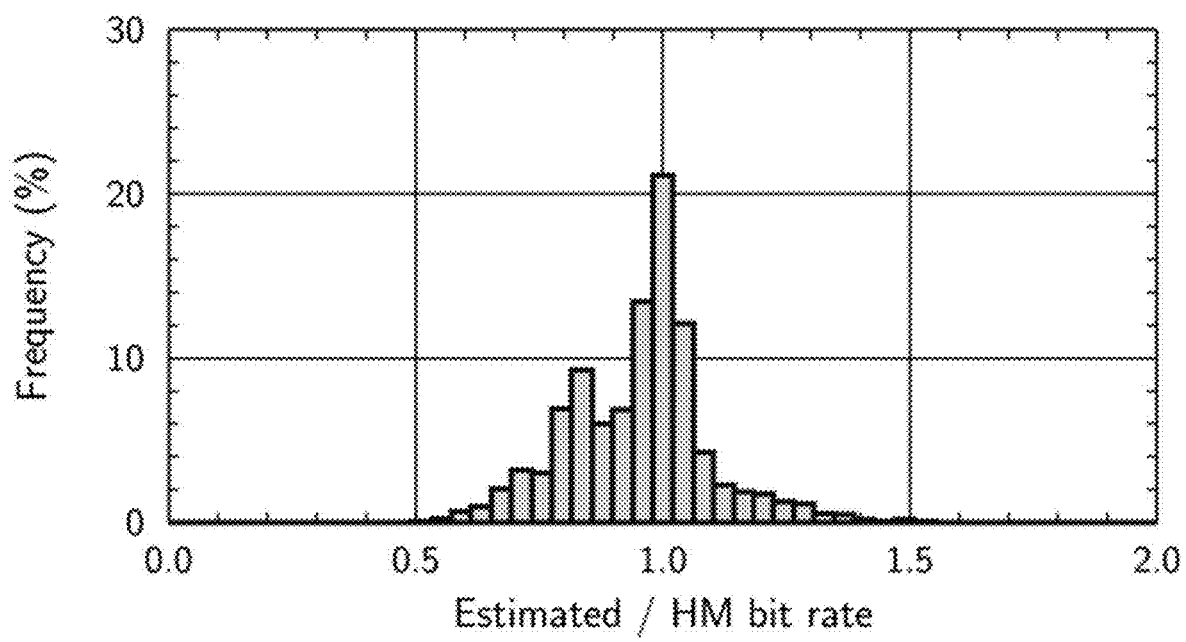

FIG. 14 shows the combined results for all QP values, which can be compared to values estimated using the non-differentiable AGP entropy coding method, shown in FIG. 15, which uses a way to model transform coefficients that is much simpler than the method used by HEVC. Finally, FIG. 16 shows the results obtained with the per-coefficient differentiable estimation of Equation 3, where the results are widely spread, indicating much lower accuracy.

FIG. 15 is a histogram of ratios between frame bit rates estimated using the AGP entropy coding method (non-differentiable) and the bit rates using by the HM software (HEVC/H.265 reference implementation), combined results for QP=22, 27, 32, and 37.

Figure 16:
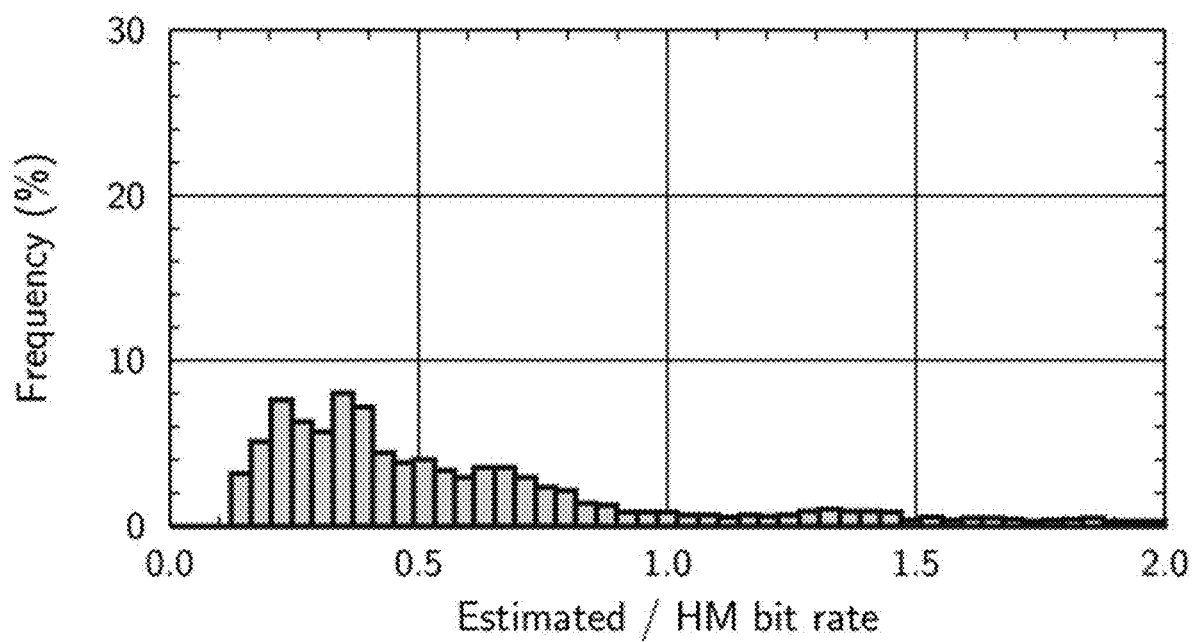

FIG. 16 is a histogram of ratios between frame bit rates estimated using the per-coefficient differentiable estimation of Equation 3 and the bit rates using by the HM software (HEVC/H.265 reference implementation), combined results for QP=22, 27, 32, and 37.

For reference, the Table 1 shows the average bit rates for the different QP values, indicating that they cover roughly one order of magnitude.

TABLE 1

| Quality setting | QP = 22 | QP = 27 | QP = 32 | QP = 37 |
|---|---|---|---|---|
| Average bit rate | 0.045 bits/pixel | 0.11 bits/pixel | 0.23 bits/pixel | 0.48 bits/pixel |

Aspects of this disclosure address a problem that occurs when the performance of standard video codecs is enhanced in several ways using neural networks (which is referred to as standard video codec neural boosting), and the gradient of performance measures cannot be backpropagated through the codec, impeding full optimization.

Aspects of this disclosure address the problem of reliably estimating the bit rates used by video encoders, while simultaneously estimating the corresponding derivatives and allowing gradient backpropagation for use during end-to-end training.

The estimation is more precise and reliable because, similarly to the entropy coding in standard encoders, it combines information from many of the discrete cosine transform (DCT) coefficients that are used for compression. This is achieved with new form of statistical model, assuming DCT coefficients have Laplace distribution, and have three parameters determined using the maximum-likelihood criterion.

The model generates the scale parameters of Laplace distributions, which is a process similar to what the entropy coding hyperprior neural networks of end-to-end neural video codecs do, and the similarity simplifies the integration of the systems and techniques described herein into systems for neural network training.

Experimental results, comparing the frame bit rates obtained with the systems and techniques described herein with the exact values from the HEVC/H.265 HM codec, show that the method provides accuracy that is very similar to non-specific and non-differentiable entropy coding methods, and is much more accurate than the methods using per-coefficient estimates.

Due to the use of a mathematical statistical model, it is possible to derive the formulas defining all necessary derivatives, which can be computed more efficiently directly with a C++ or CUDA GPU implementation, instead of automatic differentiation.

Figure 17:
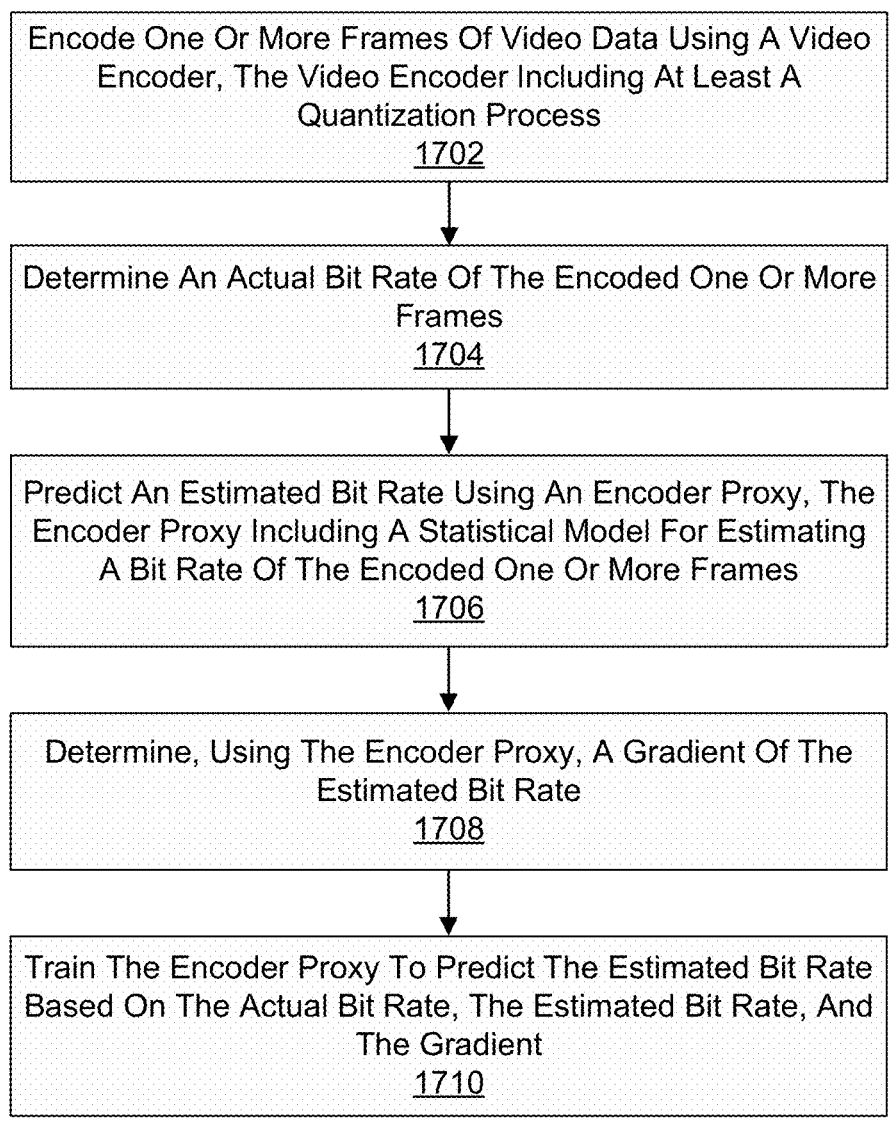
FIG. 17 is a flow diagram illustrating a technique for performing bit rate estimation, in accordance with aspects of the present disclosure.

FIG. 17 is a flow diagram illustrating a technique for performing bit rate estimation 1700, in accordance with aspects of the present disclosure. At operation 1702, the technique 1700 can include encoding one or more frames of video data using a video encoder, the video encoder including at least a quantization process as shown in FIGS. 6A-6B and 7. At operation 1704, the technique 1700 can include determining an actual bit rate of the encoded one or more frames as shown in FIGS. 6A-6B and 7.

At operation 1706, the technique 1700 can include predicting an estimated bit rate using an encoder proxy, the encoder proxy including a statistical model for estimating a bit rate of the encoded one or more frames, as shown in FIG. 8. In some cases, the encoder proxy estimates output of one or more processes of the video encoder. In some cases, the statistical model is based on a Laplace distribution of coefficients input to the quantization process of the video encoder. In some cases, the technique 1700 can also include estimating an output of the quantization process based on a maximum-likelihood estimation of the Laplace distribution.

At operation 1708, the technique 1700 can include determining, using the encoder proxy, a gradient of the estimated bit rate, as shown in FIG. 8. In some cases, the video encoder can include an entropy coding process after the quantization process, and further comprising estimating an output of the entropy coding process based on intervals around coefficients input to the quantization process of the video encoder. In some cases, the estimated bit rate is based on an estimated output of the quantization process and an estimated output of the quantization process. In some cases, the gradient is determined based on at least a derivative of the statistical model.

At operation 1710, the technique can include training the encoder proxy to predict the estimated bit rate based on the actual bit rate, the estimated bit rate, and the gradient FIG. 18 is a flow diagram illustrating a technique for performing bit rate estimation 1800, in accordance with aspects of the present disclosure. At operation 1802, the technique 1800 can include receiving one or more frames of video data for encoding by a video encoder, the video encoder including at least a quantization process, as shown in FIGS. 6A-6B and 7.

At operation 1804, the technique 1800 can include predicting an estimated bit rate of the one or more frames after encoding by the video encoder using an encoder proxy, wherein the encoder proxy including a statistical model for estimating the estimated bit rate, and wherein the statistical model was trained based on a gradient of the estimated bit rate, as shown in FIGS. 6B-8. In some cases, the encoder proxy estimates output of one or more processes of the video encoder. In some cases, the statistical model is based on a Laplace distribution of coefficients input to the quantization process of the video encoder. In some cases, the technique 1800 can also include estimating an output of the quantization process based on a maximum-likelihood estimation of the Laplace distribution. In some cases, the video encoder can include an entropy coding process after the quantization process, and further comprising estimating an output of the entropy coding process based on intervals around coefficients input to the quantization process of the video encoder. In some cases, the estimated bit rate is based on an estimated output of the quantization process and an estimated output of the quantization process. In some cases, the gradient is determined based on at least a derivative of the statistical model.

At operation 1806, the technique 1800 can adjust one or more quality parameters based on the predicted estimated bit rate, as shown in FIG. 6A. At operation 1808, the technique 1800 can encode the one or more frames of video data using the video encoder, the video encoder including at least a quantization process, as shown in FIGS. 6A and 7.

Figure 19:
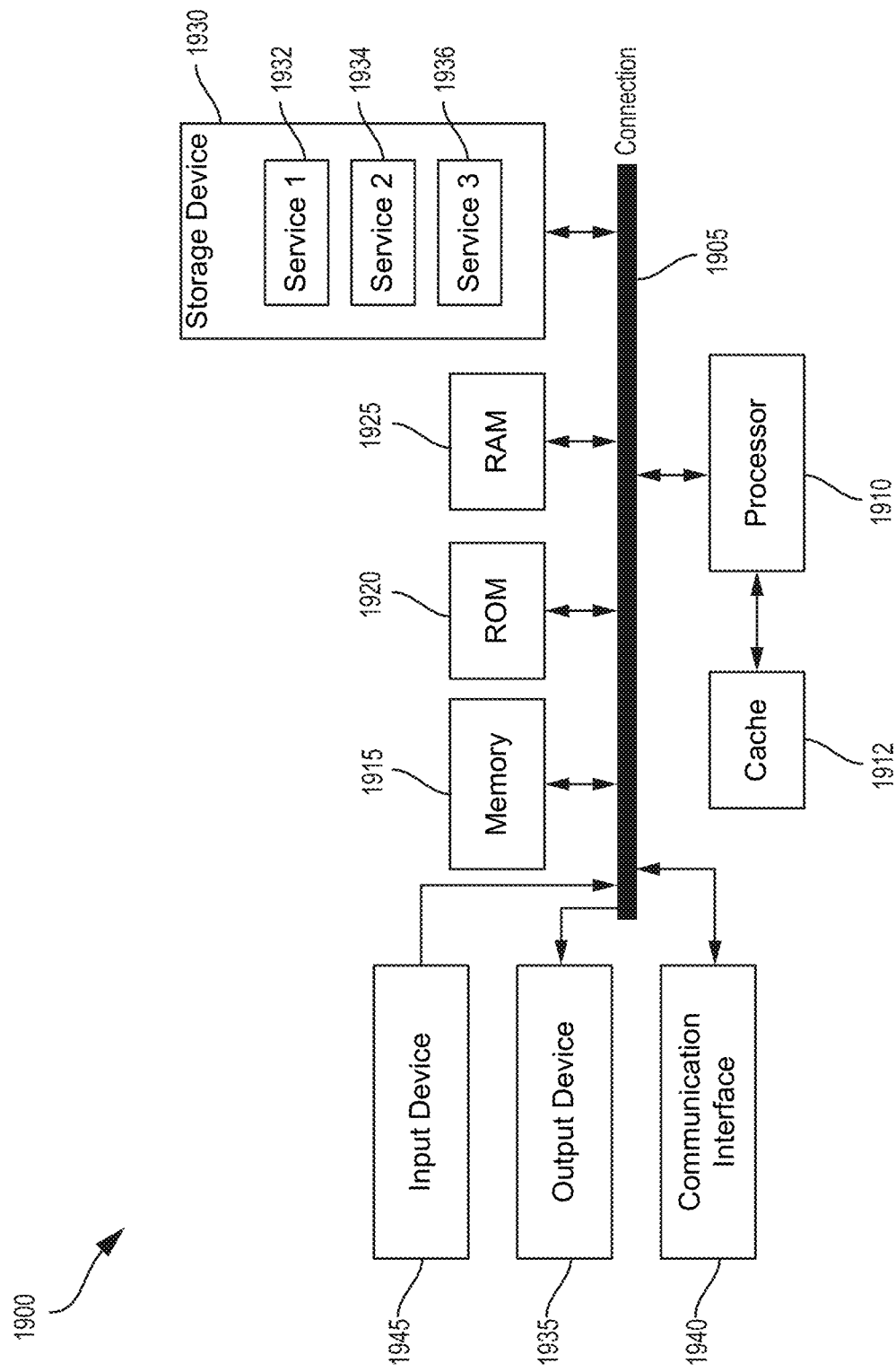
FIG. 19 is an example computing device that can implement the various techniques described herein.

FIG. 19 illustrates an example computing device architecture 1900 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 1900 can be used as part of the system 200 of FIG. 2 and/or the system 300 of FIG. 3. The components of computing device architecture 1900 are shown in electrical communication with each other using connection 1905, such as a bus. The example computing device architecture 1900 includes a processing unit (CPU or processor) 1910 and computing device connection 1905 that couples various computing device components including computing device memory 1915, such as read only memory (ROM) 1920 and random access memory (RAM) 1925, to processor 1910.

Computing device architecture 1900 can include a cache of high-speed memory connected directly with, in close proximity to, or integrated as part of processor 1910. Computing device architecture 1900 can copy data from memory 1915 and/or the storage device 1930 to cache 1912 for quick access by processor 1910. In this way, the cache can provide a performance boost that avoids processor 1910 delays while waiting for data. These and other modules can control or be configured to control processor 1910 to perform various actions. Other computing device memory 1915 may be available for use as well. Memory 1915 can include multiple different types of memory with different performance characteristics. Processor 1910 can include any general purpose processor and a hardware or software service, such as service 1 1932, service 2 1934, and service 3 1936 stored in storage device 1930, configured to control processor 1910 as well as a special-purpose processor where software instructions are incorporated into the processor design. Processor 1910 may be a self-contained system, containing multiple cores or processors, a bus, memory controller, cache, etc. A multi-core processor may be symmetric or asymmetric.

To enable user interaction with the computing device architecture 1900, input device 1945 can represent any number of input mechanisms, such as a microphone for speech, a touch-sensitive screen for gesture or graphical input, keyboard, mouse, motion input, speech and so forth. Output device 1935 can also be one or more of a number of output mechanisms known to those of skill in the art, such as a display, projector, television, speaker device, etc. In some instances, multimodal computing devices can enable a user to provide multiple types of input to communicate with computing device architecture 1900. Communication interface 1940 can generally govern and manage the user input and computing device output. There is no restriction on operating on any particular hardware arrangement and therefore the basic features here may easily be substituted for improved hardware or firmware arrangements as they are developed.

Storage device 1930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1925, read only memory (ROM) 1920, and hybrids thereof. Storage device 1930 can include services 1932, 1934, 1936 for controlling processor 1910. Other hardware or software modules are contemplated. Storage device 1930 can be connected to the computing device connection 1905. In one aspect, a hardware module that performs a particular function can include the software component stored in a computer-readable medium in connection with the necessary hardware components, such as processor 1910, connection 1905, output device 1935, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of processing video data. The method comprising: encoding one or more frames of video data using a video encoder, the video encoder including at least a quantization process; determining an actual bit rate of the encoded one or more frames; predicting an estimated bit rate using an encoder proxy, the encoder proxy including a statistical model for estimating a bit rate of the encoded one or more frames; determining, using the encoder proxy, a gradient of the estimated bit rate; and training the encoder proxy to predict the estimated bit rate based on the actual bit rate, the estimated bit rate, and the gradient.

Aspect 2. The method of claim 1, wherein the encoder proxy estimates output of one or more processes of the video encoder.

Aspect 3. The method of any of claims 1-2, wherein statistical model is based on a Laplace distribution of coefficients input to the quantization process of the video encoder.

Aspect 4. The method of claim 3, further comprising estimating an output of the quantization process based on a maximum-likelihood estimation of the Laplace distribution.

Aspect 5. The method of any of claims 1-4, wherein the video encoder further includes an entropy coding process after the quantization process, and further comprising estimating an output of the entropy coding process based on intervals around coefficients input to the quantization process of the video encoder.

Aspect 6. The method of claim 5, wherein the estimated bit rate is based on an estimated output of the quantization process and an estimated output of the quantization process.

Aspect 7. The method of claim 1, wherein the gradient is determined based on at least a derivative of the statistical model.

Aspect 8. An apparatus for processing video data, the apparatus comprising: at least one memory; and at least one processor coupled to the at least one memory, wherein the at least one processor is configured to: encode one or more frames of video data using a video encoder, the video encoder including at least a quantization process; determine an actual bit rate of the encoded one or more frames; predict an estimated bit rate using an encoder proxy, the encoder proxy including a statistical model for estimating a bit rate of the encoded one or more frames; determine, using the encoder proxy, a gradient of the estimated bit rate; and train the encoder proxy to predict the estimated bit rate based on the actual bit rate, the estimated bit rate, and the gradient.

Aspect 9. The apparatus of claim 8, wherein the encoder proxy estimates output of one or more processes of the video encoder.

Aspect 10. The apparatus of any of claims 8-9, wherein statistical model is based on a Laplace distribution of coefficients input to the quantization process of the video encoder.

Aspect 11. The apparatus of claim 10, wherein the at least one processor is further configured to estimate an output of the quantization process based on a maximum-likelihood estimation of the Laplace distribution.

Aspect 12. The apparatus of any of claims 8-11, wherein the video encoder further includes an entropy coding process after the quantization process, and wherein the processor is further configured to estimate an output of the entropy coding process based on intervals around coefficients input to the quantization process of the video encoder.

Aspect 13. The apparatus of claim 12, wherein the estimated bit rate is based on an estimated output of the quantization process and an estimated output of the quantization process.

Aspect 14. The apparatus of claim 8, wherein the gradient is determined based on at least a derivative of the statistical model.

Aspect 15. A method for processing video data, the method comprising: receiving one or more frames of video data for encoding by a video encoder, the video encoder including at least a quantization process; predicting an estimated bit rate of the one or more frames after encoding by the video encoder using an encoder proxy, wherein the encoder proxy including a statistical model for estimating the estimated bit rate, and wherein the statistical model was trained based on a gradient of the estimated bit rate; adjusting one or more quality parameters based on the predicted estimated bit rate; and encoding the one or more frames of video data using the video encoder.

Aspect 16. The method of claim 15, wherein the encoder proxy estimates output of one or more processes of the video encoder.

Aspect 17. The method of any of claims 15-16, wherein statistical model is based on a Laplace distribution of coefficients input to the quantization process of the video encoder.

Aspect 18. The method of claim 17, further comprising estimating an output of the quantization process based on a maximum-likelihood estimation of the Laplace distribution.

Aspect 19. The method of any of claims 15-18, wherein the video encoder further includes an entropy coding process after the quantization process, and wherein the method further comprises estimating an output of the entropy coding process based on intervals around coefficients input to the quantization process of the video encoder.

Aspect 20. The method of claim 19, wherein the estimated bit rate is based on an estimated output of the quantization process and an estimated output of the quantization process.

Aspect 21. The method of claim 15, wherein the gradient is determined based on at least a derivative of the statistical model.

Aspect 22. An apparatus for processing video data, the apparatus comprising: at least one memory; and at least one processor coupled to the at least one memory, the at least one processor being configured to: receive one or more frames of video data for encoding by a video encoder, the video encoder including at least a quantization process; predict an estimated bit rate of the one or more frames after encoding by the video encoder using an encoder proxy, wherein the encoder proxy including a statistical model for estimating the estimated bit rate, and wherein the statistical model was trained based on a gradient of the estimated bit rate; adjust one or more quality parameters based on the predicted estimated bit rate; and encode the one or more frames of video data using the video encoder.

Aspect 23. The apparatus of claim 22, wherein the encoder proxy estimates output of one or more processes of the video encoder.

Aspect 24. The apparatus of any of claims 22-23, wherein statistical model is based on a Laplace distribution of coefficients input to the quantization process of the video encoder.

Aspect 25. The apparatus of claim 24, wherein the at least one processor is further configured to estimate an output of the quantization process based on a maximum-likelihood estimation of the Laplace distribution.

Aspect 26. The apparatus of claims 22-25, wherein the video encoder further includes an entropy coding process after the quantization process, and wherein the processor is further configured to estimate an output of the entropy coding process based on intervals around coefficients input to the quantization process of the video encoder.

Aspect 27. The apparatus of claim 26, wherein the estimated bit rate is based on an estimated output of the quantization process and an estimated output of the quantization process.

Aspect 28. The apparatus of claim 22, wherein the gradient is determined based on at least a derivative of the statistical model.

Aspect 29. A method for processing video data, the method comprising: receiving one or more frames of video data for encoding by a video encoder; predicting an estimated bit rate of the one or more frames after encoding by the video encoder using an encoder proxy, wherein the encoder proxy including a statistical model for estimating the estimated bit rate; determining, using the encoder proxy, a gradient of the estimated bit rate; encoding the one or more frames of video data using the video encoder, the video encoder including at least a quantization process; obtaining an actual bit rate of the encoded one or more frames; and updating the encoder proxy based on a comparison between the estimated bit rate and actual bit rate.

Aspect 30. The method of claim 29, wherein the encoder proxy estimates output of one or more processes of the video encoder.

Aspect 31. The method of any of claims 29-30, wherein statistical model is based on a Laplace distribution of coefficients input to the quantization process of the video encoder.

Aspect 32. The method of claim 31, further comprising estimating an output of the quantization process based on a maximum-likelihood estimation of the Laplace distribution.

Aspect 33. The method of any of claims 29-32, wherein the video encoder further includes an entropy coding process after the quantization process, and wherein the method further comprises estimating an output of the entropy coding process based on intervals around coefficients input to the quantization process of the video encoder.

Aspect 34. The method of claim 33, wherein the estimated bit rate is based on an estimated output of the quantization process and an estimated output of the quantization process.

Aspect 35. The method of claim 29, wherein the gradient is determined based on at least a derivative of the statistical model.

Aspect 36. An apparatus for processing video data, the apparatus comprising: at least one memory; and at least one processor coupled to the at least one memory, the at least one processor being configured to: receive one or more frames of video data for encoding by a video encoder; predict an estimated bit rate of the one or more frames after encoding by the video encoder using an encoder proxy, wherein the encoder proxy including a statistical model for estimating the estimated bit rate; determine, using the encoder proxy, a gradient of the estimated bit rate; encode the one or more frames of video data using the video encoder, the video encoder including at least a quantization process; obtain an actual bit rate of the encoded one or more frames; and update the encoder proxy based on a comparison between the estimated bit rate and actual bit rate.

Aspect 37. The apparatus of claim 36, wherein the encoder proxy estimates output of one or more processes of the video encoder.

Aspect 38. The apparatus of any of claims 36-37, wherein statistical model is based on a Laplace distribution of coefficients input to the quantization process of the video encoder.

Aspect 39. The apparatus of claim 38, wherein the at least one processor is further configured to estimate an output of the quantization process based on a maximum-likelihood estimation of the Laplace distribution.

Aspect 40. The apparatus of claims 36-39, wherein the video encoder further includes an entropy coding process after the quantization process, and wherein the at least one processor is further configured to estimate an output of the entropy coding process based on intervals around coefficients input to the quantization process of the video encoder.

Aspect 41. The apparatus of claim 39, wherein the estimated bit rate is based on an estimated output of the quantization process and an estimated output of the quantization process.

Aspect 42. The apparatus of claim 36, wherein the gradient is determined based on at least a derivative of the statistical model.

Aspect 43: The apparatus of any of Aspects 8 to 14, 22-28, and 37-42 wherein the apparatus includes an encoder.

Aspect 44: The apparatus of any of Aspects 8 to 14, 22-28, and 37-43 further comprising a display configured to display one or more output pictures.

Aspect 45: The apparatus of any of Aspects 8 to 14, 22-28, and 37-44, further comprising a camera configured to capture one or more pictures.

Aspect 46: The apparatus of any of Aspects 8 to 14, 22-28, and 37-45, wherein the apparatus is a mobile device.

Aspect 47: An apparatus for processing video data, comprising means for performing one or more of operations according to any of Aspects 8 to 14, 22-28, and 37-46.

Aspect 48: A non-transitory computer-readable storage medium having stored thereon instructions that, when executed by one or more processors, cause the one or more processors to perform operations according to any one or more of Aspects 1-7, 15-21, and/or 29-35.

Aspect 49: An apparatus comprising one or more means for performing operations according to any one or more of Aspects 1-7, 15-21, and/or 29-35.

What is claimed is:

1. A method for processing video data, the method comprising:
    encoding one or more frames of video data using a video encoder, the video encoder including at least a quantization process;
    determining an actual bit rate of the encoded one or more frames;
    predicting an estimated bit rate using an encoder proxy, the encoder proxy including a statistical model for estimating a bit rate of the encoded one or more frames;
    determining, using the encoder proxy, a gradient of the estimated bit rate; and
    training the encoder proxy to predict the estimated bit rate based on the actual bit rate, the estimated bit rate, and the gradient.

2. The method of claim 1, wherein the encoder proxy estimates output of one or more processes of the video encoder.

3. The method of claim 1, wherein statistical model is based on a Laplace distribution of coefficients input to the quantization process of the video encoder.

4. The method of claim 3, further comprising estimating an output of the quantization process based on a maximum-likelihood estimation of the Laplace distribution.

5. The method of claim 1, wherein the video encoder further includes an entropy coding process after the quantization process, and further comprising estimating an output of the entropy coding process based on intervals around coefficients input to the quantization process of the video encoder.

6. The method of claim 5, wherein the estimated bit rate is based on an estimated output of the quantization process and an estimated output of the quantization process.

7. The method of claim 1, wherein the gradient is determined based on at least a derivative of the statistical model.

8. An apparatus for processing video data, the apparatus comprising:
    at least one memory; and
    at least one processor coupled to the at least one memory, wherein the at least one processor is configured to:
        encode one or more frames of video data using a video encoder, the video encoder including at least a quantization process;
        determine an actual bit rate of the encoded one or more frames;
        predict an estimated bit rate using an encoder proxy, the encoder proxy including a statistical model for estimating a bit rate of the encoded one or more frames;
        determine, using the encoder proxy, a gradient of the estimated bit rate; and
        train the encoder proxy to predict the estimated bit rate based on the actual bit rate, the estimated bit rate, and the gradient.

9. The apparatus of claim 8, wherein the encoder proxy estimates output of one or more processes of the video encoder.

10. The apparatus of claim 8, wherein statistical model is based on a Laplace distribution of coefficients input to the quantization process of the video encoder.

11. The apparatus of claim 10, wherein the at least one processor is further configured to estimate an output of the quantization process based on a maximum-likelihood estimation of the Laplace distribution.

12. The apparatus of claim 8, wherein the video encoder further includes an entropy coding process after the quantization process, and wherein the at least one processor is further configured to estimate an output of the entropy coding process based on intervals around coefficients input to the quantization process of the video encoder.

13. The apparatus of claim 12, wherein the estimated bit rate is based on an estimated output of the quantization process and an estimated output of the quantization process.

14. The apparatus of claim 8, wherein the gradient is determined based on at least a derivative of the statistical model.

15. A method for processing video data, the method comprising:
- receiving one or more frames of video data for encoding by a video encoder, the video encoder including at least a quantization process;
- predicting an estimated bit rate of the one or more frames after encoding by the video encoder using an encoder proxy, wherein the encoder proxy uses a statistical model for estimating the estimated bit rate, and wherein the statistical model was trained based on a gradient of the estimated bit rate;
- adjusting one or more quality parameters of the video encoder based on the predicted estimated bit rate; and
- encoding the one or more frames of video data using the video encoder.

16. The method of claim 15, wherein the encoder proxy estimates output of one or more processes of the video encoder.

17. The method of claim 15, wherein statistical model is based on a Laplace distribution of coefficients input to the quantization process of the video encoder.

18. The method of claim 17, further comprising estimating an output of the quantization process based on a maximum-likelihood estimation of the Laplace distribution.

19. The method of claim 15, wherein the video encoder further includes an entropy coding process after the quantization process, and wherein the method further comprises estimating an output of the entropy coding process based on intervals around coefficients input to the quantization process of the video encoder.

20. The method of claim 19, wherein the estimated bit rate is based on an estimated output of the quantization process and an estimated output of the quantization process.

21. The method of claim 15, wherein the gradient is determined based on at least a derivative of the statistical model.

22. An apparatus for processing video data, the apparatus comprising:
- at least one memory; and
- at least one processor coupled to the at least one memory, wherein the at least one processor is configured to:
  - receive one or more frames of video data for encoding by a video encoder, the video encoder including at least a quantization process;
  - predict an estimated bit rate of the one or more frames after encoding by the video encoder using an encoder proxy, wherein the encoder proxy uses a statistical model for estimating the estimated bit rate, and wherein the statistical model was trained based on a gradient of the estimated bit rate;
  - adjust one or more quality parameters of the video encoder based on the predicted estimated bit rate; and
  - encode the one or more frames of video data using the video encoder.

23. The apparatus of claim 22, wherein the encoder proxy estimates output of one or more processes of the video encoder.

24. The apparatus of claim 22, wherein statistical model is based on a Laplace distribution of coefficients input to the quantization process of the video encoder.

25. The apparatus of claim 24, wherein the at least one processor is further configured to estimate an output of the quantization process based on a maximum-likelihood estimation of the Laplace distribution.

26. The apparatus of claim 22, wherein the video encoder further includes an entropy coding process after the quantization process, and wherein the at least one processor is configured to estimate an output of the entropy coding process based on intervals around coefficients input to the quantization process of the video encoder.

27. The apparatus of claim 26, wherein the estimated bit rate is based on an estimated output of the quantization process and an estimated output of the quantization process.

28. The apparatus of claim 22, wherein the gradient is determined based on at least a derivative of the statistical model.

29. The apparatus of claim 22, wherein the apparatus is the video encoder.

30. The apparatus of claim 22, wherein the apparatus includes the video encoder.

* * * * *